(12) United States Patent
Dumbuya et al.

(10) Patent No.: US 10,328,388 B2
(45) Date of Patent: Jun. 25, 2019

(54) DIESEL OXIDATION CATALYST

(71) Applicant: BASF Corporation, Florham Park, NJ (US)

(72) Inventors: Karifala Dumbuya, Hannover (DE); Claudia Zabel, Hannover (DE); Susanne Stiebels, Adenbuettel (DE); Shiang Sung, New York, NY (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/748,501

(22) PCT Filed: Jul. 29, 2016

(86) PCT No.: PCT/US2016/044713
§ 371 (c)(1),
(2) Date: Jan. 29, 2018

(87) PCT Pub. No.: WO2017/019958
PCT Pub. Date: Feb. 2, 2017

(65) Prior Publication Data
US 2018/0214824 A1    Aug. 2, 2018

(30) Foreign Application Priority Data
Jul. 30, 2015 (EP) ..................................... 15179053

(51) Int. Cl.
| | | |
|---|---|---|
| *B01D 53/94* | (2006.01) | |
| *B01J 23/63* | (2006.01) | |
| *B01J 29/76* | (2006.01) | |
| *B01J 35/00* | (2006.01) | |
| *B01J 37/02* | (2006.01) | |

(52) U.S. Cl.
CPC ............ *B01D 53/944* (2013.01); *B01J 23/63* (2013.01); *B01J 29/7615* (2013.01); *B01J 35/0006* (2013.01); *B01J 37/0244* (2013.01); *B01J 37/0246* (2013.01); *B01D 53/9477* (2013.01); *B01D 2251/2067* (2013.01); *B01D 2255/1021* (2013.01); *B01D 2255/1023* (2013.01); *B01D 2255/2063* (2013.01); *B01D 2255/2065* (2013.01); *B01D 2255/2092* (2013.01); *B01D 2255/30* (2013.01); *B01D 2255/502* (2013.01); *B01D 2255/9022* (2013.01); *B01D 2255/9025* (2013.01); *B01D 2255/9032* (2013.01); *B01D 2258/012* (2013.01)

(58) Field of Classification Search
CPC ............ B01D 53/944; B01D 2255/102; B01D 2255/1021; B01D 2255/1023; B01D 2255/9025; B01D 2258/01; F01N 3/103; B01J 23/40; B01J 23/44; B01J 29/00; B01J 33/00; B01J 35/0006; B01J 37/0244; B01J 37/0246
See application file for complete search history.

(56) References Cited

U.S. PATENT DOCUMENTS

| | | | | |
|---|---|---|---|---|
| 3,931,050 A | * | 1/1976 | Asano | ................ B01D 53/9413 502/303 |
| 4,536,488 A | * | 8/1985 | Wanke | ..................... B01J 23/42 423/580.2 |
| 4,956,322 A | * | 9/1990 | Gouzard | .................. B01J 33/00 502/62 |
| 5,179,054 A | * | 1/1993 | Schipper | ................... B01J 33/00 502/65 |
| 6,190,627 B1 | * | 2/2001 | Hoke | .................... B01D 53/864 165/41 |
| 6,569,393 B1 | * | 5/2003 | Hoke | ................... B01D 53/864 423/219 |
| 9,044,734 B2 | | 6/2015 | Grubert et al. | |
| 9,120,084 B2 | * | 9/2015 | Kimura | ................ B01D 53/945 |
| 2006/0030481 A1 | * | 2/2006 | LaBarge | .............. B01D 53/944 502/324 |
| 2006/0211569 A1 | | 9/2006 | Dang et al. | |
| 2008/0279738 A1 | | 11/2008 | Strehlau et al. | |
| 2012/0308439 A1 | | 12/2012 | Chen et al. | |
| 2014/0170043 A1 | | 6/2014 | Hoke et al. | |
| 2015/0165422 A1 | | 6/2015 | Sung et al. | |
| 2015/0165423 A1 | | 6/2015 | Sung et al. | |
| 2018/0029016 A1 | | 2/2018 | Sung et al. | |

FOREIGN PATENT DOCUMENTS

| | | | | |
|---|---|---|---|---|
| JP | 2016 221517 A | * | 12/2016 | .............. B01J 29/46 |
| WO | WO 2017/019958 | | 2/2017 | |

* cited by examiner

*Primary Examiner* — Timothy C Vanoy
(74) *Attorney, Agent, or Firm* — Womble Bond Dickinson (US) LLP

(57) ABSTRACT

An oxidation catalyst composite, methods, and systems for the treatment of exhaust gas emis-sions from a diesel engine are described. More particularly, described is an oxidation catalyst composite including a first oxidation material comprising a first refractory metal oxide support, a rare earth oxide, and palladium (Pd); a second oxidation material comprising a second refractory metal oxide, and platinum (Pt) and palladium (Pd); and a protective overlayer comprising a third refractory metal oxide, platinum (Pt) and, optionally, palladium (Pd), and a molecular sieve promoted with a metal selected from one or more of Cu, Fe, Co, Ni, Mn, V, and, Ag. The oxid-ation catalyst composite is sulfur tolerant.

28 Claims, 13 Drawing Sheets

DIESEL OXIDATION CATALYST

CROSS-REFERENCE TO RELATED APPLICATIONS

The present application is a U.S. National Stage of International Patent Application PCT/US2016/044713, filed Jul. 29, 2016 and claims priority to European Patent Application No. 15179053.2, filed Jul. 30, 2015. The disclosures of each of the applications noted above are incorporated herein by reference in their entirety.

The present invention relates to diesel oxidation catalysts. More specifically, embodiments are directed to oxidation catalyst composites comprising a protective overlayer including a molecular sieve promoted with a metal. The oxidation catalyst composites are sulfur tolerant and are used for low temperature CO oxidation.

Operation of lean burn engines, for example, diesel engines and lean burn gasoline engines, provide the user with excellent fuel economy and have low emissions of gas phase hydrocarbons and carbon monoxide due to their operation at high air/fuel ratios under fuel lean conditions. Additionally, diesel engines offer significant advantages over gasoline (spark ignition) engines in terms of their fuel economy, durability, and their ability to generate high torque at low speed.

From the standpoint of emissions, however, diesel engines can present more severe problems than their spark-ignition counterparts. Because diesel engine exhaust gas is a heterogeneous mixture, emission problems relate to particulate matter (PM), nitrogen oxides ($NO_x$), unburned hydrocarbons (HC), and carbon monoxide (CO).

NO is a term used to describe various chemical species of nitrogen oxides, including nitrogen monoxide (NO) and nitrogen dioxide ($NO_2$), among others. NO is of concern because it transforms into $NO_2$ in the upper atmosphere where it is believed to undergo a process known as photochemical smog formation, through a series of reactions in the presence of sunlight. Hydrocarbons are a concern because they are a significant contributor to acid rain. Ground level $NO_2$, on the other hand, has a high potential as an oxidant and is a strong lung irritant.

Effective abatement of NO from lean burn engines is difficult to achieve because high $NO_x$ conversion rates typically require reductant-rich conditions. Conversion of the NO component of exhaust streams to innocuous components generally requires specialized NO abatement strategies for operation under fuel lean conditions. One of these strategies utilizes selective catalytic reduction (SCR) of $NO_x$, which involves the reaction of NO in the presence of a reductant (e.g. urea) over a SCR catalyst, for example vanadia-titania based catalysts or zeolites promoted with a base metal such as Cu, Fe, or other base metals. A performance enhancement can be observed when there is an adequate ratio of $NO_2/NO_x$ in the feed gas to the SCR catalyst, especially in the low temperature range (i.e. <250° C.). Oxidation catalysts comprising a precious metal such as a platinum group metal (PGM) dispersed on a refractory metal oxide support are known for use in treating the exhaust of diesel engines to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from a diesel-powered engine to treat the exhaust before it vents to the atmosphere. Typically, the diesel oxidation catalysts are formed on ceramic or metallic carrier substrates (such as, e.g., a flow-through monolith carrier), upon which one or more catalyst coating compositions are deposited. In addition to the conversions of gaseous HC, CO, and the soluble organic fraction (SOF) of particulate matter, oxidation catalysts that contain platinum group metals (which are typically dispersed on a refractory oxide support) promote the oxidation of nitric oxide (NO) to nitrogen dioxide ($NO_2$).

Catalysts used to treat the exhaust of internal combustion engines are less effective during periods of relatively low temperature operation, such as the initial cold-start period of engine operation because the engine exhaust is not at a temperature sufficiently high enough for efficient catalytic conversion of noxious components in the exhaust. To this end, an adsorbent material, such as a zeolite, can be included as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

Oxidation catalysts comprising a platinum group metal (PGM) dispersed on a refractory metal oxide support are known for use in treating exhaust gas emissions from diesel engines. Platinum (Pt) remains the most effective metal for oxidizing CO and HC in a DOC, after high temperature aging under lean conditions and in the presence of fuel sulfur. One of the major advantages of using palladium (Pd) based catalysts is the lower cost of Pd compared to Pt. However, Pd based diesel oxidation catalysts typically show higher light-off temperatures for oxidation of CO and HC, especially when used to treat exhaust containing high levels of sulfur (from high sulfur containing fuels) or when used with HC storage materials. The "light-off" temperature for a specific component is defined as the temperature at which 50% of that component reacts. Pd-containing DOCs may poison the activity of Pt to convert HCs and/or oxidize $NO_x$ and may also make the catalyst more susceptible to sulfur poisoning. These characteristics have typically limited the use of Pd-rich oxidation catalysts in lean burn operations, especially for light duty diesel application where engine temperatures remain below 250° C. for most driving conditions.

Low temperature CO oxidation automotive catalysts, with a layered design containing a Pd/Ceria layer have been developed. These catalysts are active in the low temperature region compared to conventional Pt/Pd/Alumina DOC formulations due to oxygen activation at Pd/ceria sites. Pd/ceria DOCs, however, have an inherent sulfur sensitivity. The Pd/ceria sites can be irreversibly damaged by sulfur, which eventually translates to poor CO performance. Desulfation of the catalyst requires high temperatures (>740° C.) in lean diesel operation or lower temperatures (550-650° C.) in rich conditions. Since most engine manufacturers are neither willing to operate under such high lean temperatures nor ready for rich operations (fuel penalty), there is an ongoing need to provide improved diesel oxidation catalysts with improved tolerance for sulfur.

WO2012/166868 describes a cold start catalyst comprising a zeolite catalyst and a supported platinum group metal catalyst. The zeolite catalyst comprises a base metal, a noble metal, and a zeolite. The supported platinum group metal catalyst comprises one or more platinum group metals and one or more inorganic oxide carriers. In WO2012/166868, at least one working example describes Fe promoted beta zeolite coated on a substrate; Pd is then added to the Fe-zeolite coated substrate, Pt/alumina forms a middle layer over the Pd—Fe/zeolite, then Pd/CeO$_2$ forms a top layer over the Pt/alumina.

WO2012/085572 describes an exhaust system comprising a first oxidation catalyst disposed on a first honeycomb monolith substrate, which first oxidation catalyst comprises platinum supported on a first metal oxide support comprising at least one reducible oxide, wherein the first oxidation catalyst is substantially free of alkali metals and alkaline earth metals. In WO2012/085572, a sulfur sink can include a molecular sieve, and when included the sulfur sink is in a first (or lower) layer.

Despite the use of molecular sieve materials in diesel oxidation catalysts, there is a need to develop improved diesel oxidation catalysts with improved tolerance for sulfur.

A first aspect of the invention is directed to an oxidation catalyst. In a first embodiment, an oxidation catalyst composite for abatement of exhaust gas emission from a lean burn engine comprises: a carrier substrate having a length, an inlet end and an outlet end, an oxidation catalyst material on the carrier, the oxidation catalyst material comprising: a first oxidation material including a first refractory metal oxide support, a rare earth oxide component, and palladium (Pd), the first oxidation material being substantially free of platinum; a second oxidation material including a second refractory metal oxide support, and platinum (Pt) and palladium (Pd) in a platinum to palladium ratio of 10:1 to 1:10, the second oxidation material being substantially free of rare earth oxide; and a protective overlayer including a third refractory metal oxide, platinum (Pt) and, optionally, palladium (Pd), and a molecular sieve promoted with a metal selected from one or more of Cu, Fe, Co, Ni, Mn, V, and Ag, the protective overlayer being substantially free of a rare earth oxide.

In a second embodiment, the oxidation catalyst composite of the first embodiment is modified, wherein the first oxidation material is in an underlayer on the carrier substrate, the second oxidation material is in a middle layer on the under layer, and the protective overlayer is in an upper layer on the middle layer.

In a third embodiment, the oxidation catalyst composite of the first embodiment is modified, wherein the first oxidation material and second oxidation material are mixed in a blended underlayer on the carrier substrate, and the protective overlayer is an upper layer on the blended underlayer.

In a fourth embodiment, the oxidation catalyst composite of the first embodiment is modified, wherein the first oxidation material and the second oxidation material are in a zoned underlayer on the carrier substrate, and the protective overlayer is an upper layer on the zoned underlayer.

In a fifth embodiment, the oxidation catalyst composite of the fourth embodiment is modified, wherein the first oxidation material is on the inlet end and the second oxidation material is on the outlet end.

In a sixth embodiment, the oxidation catalyst composite of the fourth embodiment is modified, wherein the second oxidation material is on the inlet end and the first oxidation material is on the outlet end.

In a seventh embodiment, the oxidation catalyst composite of any of the first through sixth embodiments is modified, wherein the first, second, and third refractory metal oxide supports independently comprise an oxide of one or more of alumina, zirconia, alumina-zirconia, lanthana-alumina, lanthana-zirconia-alumina, baria-alumina, baria-lanthana-alumina, baria-lanthana-neodymia-alumina, alumina-chromia.

In an eighth embodiment, the oxidation catalyst composite of any of the first through seventh embodiments is modified, wherein the first oxidation material comprises palladium in an amount in the range of about 1 g/ft$^3$ to 70 g/ft$^3$, and wherein the second oxidation material comprises palladium and platinum in an amount in the range of about 5 g/ft$^3$ to about 150 g/ft$^3$.

In a ninth embodiment, the oxidation catalyst composite of any of the first through eighth embodiments is modified, wherein the rare earth oxide is selected from ceria (Ce), lanthana (La), praseodymia (Pr), neodynmia (Nd), europia (Eu), samaria (Sm), ytterbia (Yb), and combinations thereof, and a stabilizer optionally mixed therein, the stabilizer selected from zirconia (Zr), niobia (Nb), yttria (Y), alumina (Al), and combinations thereof.

In a tenth embodiment, the oxidation catalyst composite of any of the first through ninth embodiments is modified, wherein the ratio of Pd to the rare earth oxide is in the range of 1 to 5 by weight, based on the weight of the first oxidation material.

In an eleventh embodiment, the oxidation catalyst composite of any of the first through tenth embodiments is modified, wherein the rare earth oxide component in the first oxidation material is present in an amount in an amount in the range 0.1 g/in$^3$ to 5 g/in$^3$.

In a twelfth embodiment, the oxidation catalyst composite of any of the first through eleventh embodiments is modified, wherein the rare earth oxide component in the first oxidation material comprises ceria (Ce).

In a thirteenth embodiment, the oxidation catalyst composite of the twelfth embodiment is modified, wherein the Ce is doped with an element selected from Si, Mn, Fe, Co, Ni, Cu, In, Sn, Ir, Pr, and combinations thereof.

In a fourteenth embodiment, the oxidation catalyst composite of any of the first through thirteenth embodiments is modified, wherein the protective overlayer comprises a molecular sieve having a six, eight, ten, or twelve ring structure.

In a fifteenth embodiment, the oxidation catalyst composite of any of the first through fourteenth embodiments is modified, wherein the molecular sieve is selected from the group consisting of Type A, chabazite, erionite, ZSM-5, ZSM-11, ZSM-23, ZSM-48, ferrierite, stilbite, faujasite, mordenite, Type L, Omega, Beta, AlPO$_4$, borosilicates, MeAPO, MeAPSO, and SAPO.

In a sixteenth embodiment, the oxidation catalyst composite of any of the first through fifteenth embodiments is modified, wherein the ratio of platinum to palladium in the second oxidation material is in the range of 5:1 to 1:5.

In a seventeenth embodiment, the oxidation catalyst composite of any of the first through sixteenth embodiments is modified, wherein the ratio of platinum to palladium in the second oxidation material is in the range of 2:1 to 1:1.

In an eighteenth embodiment, the oxidation catalyst composite of any of the first through seventeenth embodiments is modified, wherein the carrier substrate is selected from a flow-through monolith, a wall-flow filter, a foam, or a mesh.

A second aspect of the present invention is directed to a method for treating a diesel engine exhaust gas stream. In a nineteenth embodiment, a method for treating a diesel engine exhaust gas stream comprises contacting an exhaust gas stream with the oxidation catalyst composite of any of the first through eighteenth embodiments, and passing the exhaust gas stream through a downstream SCR catalyst.

In a twentieth embodiment, the method of the nineteenth embodiment is modified, wherein the downstream SCR catalyst is disposed on a wall flow filter.

A third aspect of the present invention is directed to a system for treatment of a lean burn engine exhaust gas stream. In a twenty-first embodiment, a system for treatment of a lean burn engine exhaust gas stream comprising hydrocarbons, carbon monoxide, nitrogen oxides, particulate matter, and other exhaust components, comprises: an exhaust conduit in fluid communication with a lean burn engine via an exhaust manifold; the oxidation catalyst composite of any of the first through eighteenth embodiments; and a catalyzed soot filter and an SCR catalyst located downstream from the oxidation catalyst composite.

In a twenty-second embodiment, the system of the twenty-first embodiment is modified, wherein the SCR catalyst is present as a washcoat on the catalyzed soot filter.

In a twenty-third embodiment, the system the twenty first and twenty-second embodiments is modified, further comprising a second SCR catalyst on a flow through monolith downstream of the SCR catalyst.

In a twenty-fourth embodiment, the system of the twenty-first embodiment is modified, wherein the SCR catalyst is on a flow through monolith downstream from the oxidation catalyst composite, and the catalyzed soot filter is downstream from the SCR catalyst.

In a twenty-fifth embodiment, the system of the twenty-first embodiment is modified, wherein the catalyzed soot filter is downstream of the oxidation catalyst composite and the SCR catalyst is on a flow through monolith downstream from the catalyzed soot filter.

In a twenty-sixth embodiment, the system of the twenty-fourth embodiment is modified, wherein the catalyzed soot filter comprises a second SCR catalyst.

In a twenty-seventh embodiment, the system of any of the twenty-first through twenty-sixth embodiments is modified, wherein the SCR catalyst comprises a molecular sieve having a double six ring (d6r) unit.

In a twenty-eighth embodiment, the system of any of the twenty-first through twenty-seventh embodiments is modified, wherein the SCR catalyst is selected from CHA, AEI, or AFX framework type zeolite.

Figure 1:
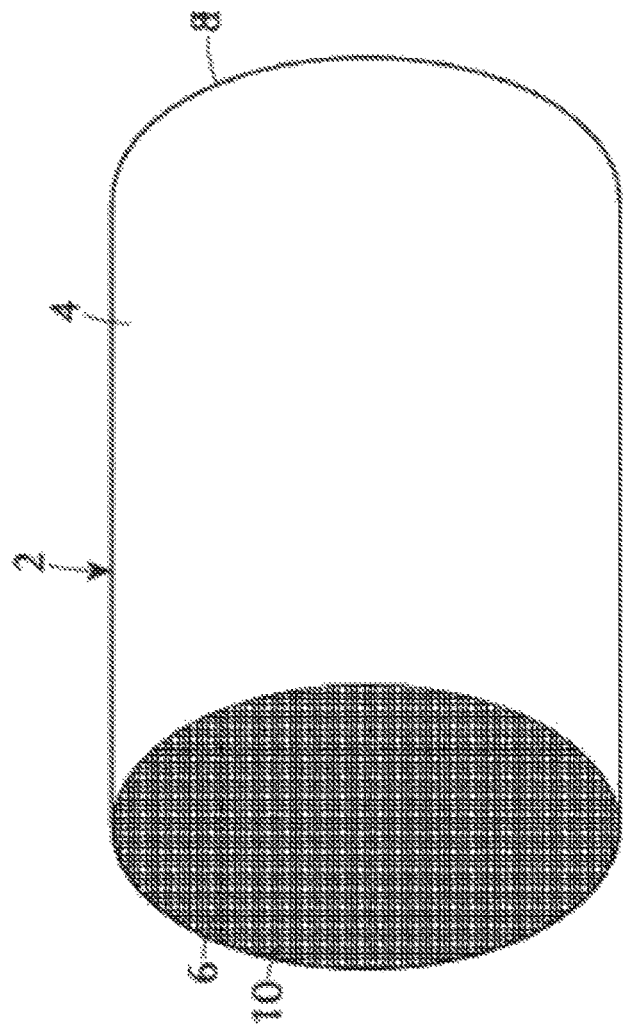
FIG. 1 is a perspective view of a honeycomb-type refractory carrier member which may comprise oxidation catalyst composites in accordance with one or more embodiments.

Before describing several exemplary embodiments of the invention, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as disclosed.

Current and future regulations require diesel oxidation catalysts (DOC) with very low CO light-off temperatures. Pd/ceria technologies offer a solution, but create a new problem, namely sulfur intolerance. Several approaches have been considered in the past, such as the use of more sulfur tolerant ceria materials in combination with sulfur resistant oxides of aluminum, lanthanum, etc. These catalysts showed some degree of recovery, but pre-sulfation activity was never recovered.

According to one or more embodiments of the invention, while the claimed invention should not be bound by a particular theory of operation, it has been determined that prevention is better than cure. In other words, in one or more embodiments, it has been determined that preventing sulfur from poisoning the active sites in the first place, rather than finding ways to eliminate the sulfur from the active sites at a later time, will result in a catalyst with improved sulfur tolerance. According to embodiments of the invention, therefore, it has been determined that incorporating a protective overlayer into the oxidation catalyst composite results in a diesel oxidation catalyst that has improved sulfur tolerance. Without intending to be bound by theory it is thought that the protective overlayer acts as a sulfur scavenger, which stores the sulfur and then releases it at lower temperatures such that the catalyst regains pre-sulfation CO $T_{50}$ light-off activity after desulfation.

According to one or more embodiments, provided is an oxidation catalyst composite for abatement of exhaust gas emissions from a lean burn engine, the catalyst composite comprising: a carrier substrate having a length, an inlet end and an outlet end, an oxidation catalyst material on the carrier, the oxidation catalyst material comprising: a first oxidation material including a first refractory metal oxide support, a rare earth oxide component, and palladium (Pd), the first washcoat being substantially free of platinum; a second oxidation material including a second refractory metal oxide support, and platinum (Pt) and palladium (Pd) in a platinum to palladium ratio of 10:1 to 1:10, the second layer being substantially free of rare earth oxide; and a protective overlayer including a third refractory metal oxide, platinum (Pt) and, optionally, palladium (Pd), and a molecular sieve promoted with a metal selected from one or more of Cu, Fe, Co, Ni, Mn, V, Ag, the protective overlayer being substantially free of rare earth oxide.

With respect to the terms used in this disclosure, the following definitions are provided.

As used herein, the term "catalyst composite" refers to a catalytic article including a carrier substrate, for example a honeycomb substrate, having one or more washcoat layers containing a catalytic component, for example, a platinum group metal component, that is effective to catalyze oxidation of CO, HC, and NO.

As used herein, the term "catalyst" or "catalyst composition" or "catalyst material" refers to a material that promotes a reaction. For example, an "oxidation material" promotes an oxidation reaction with one or more components of exhaust gas.

As used herein, the term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in slurry, which is applied to a substrate, dried and calcined to provide the porous washcoat.

As used herein, "Pt" or "platinum," "Pd," or "palladium" and reference to other platinum group metals such as "Rh" or "rhodium" refers to the respective platinum group metal compound, complex, or the like which, upon calcination or use of the catalyst decomposes or otherwise converts to a catalytically active form, usually, the metal or the metal oxide.

As used herein, the terms "refractory metal oxide support" and "support" refer to the underlying high surface area material upon which additional chemical compounds or elements are carried. The support particles have pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina, silica, titania, manganese, and other materials are known for such use.

One or more embodiments of the present invention include a refractory metal oxide support comprising an activated compound selected from the group consisting of alumina, zirconia, silica, titania, ceria, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, or zirconia-titania, or combinations thereof. Although many of these materials suffer from the disadvantage of having a considerably lower BET surface area than activated alumina, that disadvantage tends to be offset by a greater durability or performance enhancement of the resulting catalyst. As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

In one or more embodiments, the first and second oxidation materials, and the protective overlayer respectively comprise first, second, and third refractory metal oxide supports. Each or any of the first, second and third refractory metal oxide supports can comprise a compound that is activated, stabilized, or both, selected from the group consisting of alumina, zirconia, alumina-zirconia, lanthana-alumina, lanthana-zirconia-alumina, baria-alumina, baria-lanthana-alumina, baria-lanthana-neodymia-alumina, alumina-chromia, and combinations thereof. The first, second, and third refractory metal oxide supports can be the same or different types of supports in composition, particle size, or other properties. In other words, the first, second and third refractory metal oxide supports may be the same support, or the first and second or first and third and second and third supports may be the same, or the first, second and third supports may be different.

As used herein, the term "platinum group metal" or "PGM" refers to one or more chemical elements defined in the Periodic Table of Elements, including platinum (Pt), palladium (Pd), rhodium (Rh), osmium (Os), iridium (Ir), and ruthenium (Rh), and mixtures thereof. In one or more embodiments, the first oxidation material comprises palladium. Generally, there are no specific restrictions as far as the palladium content of the first oxidation material is concerned. In specific embodiments, the loading of Pd in the first oxidation material can be in the range of about 1 $g/ft^3$ to about 70 $g/ft^3$, including about 5 $g/ft^3$ to about 50 $g/ft^3$, about 5 $g/ft^3$ to about 40 $g/ft^3$, about 5 $g/ft^3$ to about 30 $g/ft^3$, about 10 $g/ft^3$ to about 50 $g/ft^3$, about 10 $g/ft^3$ to about 30 $g/ft^3$, about 10 $g/ft^3$ to about 30 $g/ft^3$, about 15 $g/ft^3$ to about 50 $g/ft^3$, about 15 $g/ft^3$ to about 40 $g/ft^3$, about 15 $g/ft^3$ to about 30 $g/ft^3$, about 20 $g/ft^3$ to about 50 $g/ft^3$, about 20 $g/ft^3$ to about 40 $g/ft^3$, and about 20 $g/ft^3$ to about 30 $g/ft^3$. In one or more specific embodiments, the loading of Pd in the first oxidation material is about 30 $g/ft^3$.

In one or more embodiments, the first oxidation material comprises palladium and is substantially free of platinum. As used herein, the term "substantially free of platinum" means that there is no platinum intentionally added to the first oxidation material, and that there is generally less than about 1% of platinum by weight in the first oxidation material. It will be appreciated by one of skill in the art, however, that during loading/coating trace amounts of platinum may migrate from one washcoat component to another, such that trace amounts of platinum can be present in the first oxidation material.

In one or more embodiments, the first oxidation material comprises a rare earth oxide. As used herein, the term "rare earth oxide" refers to at least one oxide of a rare earth metal selected from ceria (Ce), lanthana (La), praseodymia (Pr), neodynmia (Nd), europia (Eu), samaria (Sm), ytterbia (Yb), and combinations thereof, and a stabilizer optionally mixed therein, the stabilizer selected from zirconia (Zr), niobia (Nb), yttria (Y), alumina (Al), and combinations thereof. In one or more embodiments, the rare earth oxide comprises ceria.

Generally, there are no specific restrictions as far as the rare earth oxide content of the first oxidation material is concerned. In specific embodiments, the loading of rare earth oxide in the first oxidation material can be in the range of about 0.1 $g/in^3$ to about 5 $g/in^3$, including about 0.1 to about 1.5 $g/in^3$, about 0.5 to about 1.5 $g/in^3$. In one or more specific embodiments, the loading of rare earth oxide in the first oxidation material is about 0.75 $g/in^3$.

In one or more embodiments, the rare earth oxide can be doped with an element selected from Si, Mn, Fe, Co, Ni, Cu, In, Sn, Ir, Pr, and combinations thereof. In specific embodiments, the rare earth oxide is ceria, and the ceria is doped with an element selected from Si, Mn, Fe, Co, Ni, Cu, In, Sn, Ir, Pr, and combinations thereof.

In one or more embodiments, the ratio of Pd to the rare earth oxide in the first oxidation materials is in the range of about 1 to about 5 by weight %, based on the weight % of the first oxidation material, including about 1.5 to about 2.5 by weight %, based on the weight % of the first oxidation material. Without intending to be bound by theory, it is thought that certain Pd/rare earth oxide, particular Pd/Ce, ratios provide optimum activity, while avoiding waste of rare earth oxide and/or palladium.

In one or more embodiments, the first oxidation material comprises alumina (or lanthana-alumina), ceria, and palladium. In such embodiments, it will be appreciated by one skilled in the art, that the ceria is present in amounts of about 30 wt. % up to about 95 wt. %, based on the total weight of the first oxidation material, including about 40 wt. % to about 70 wt. %, based on the total weight of the first oxidation material. In a specific embodiment, the first oxidation material comprises ceria in an amount of about 49 wt. %, alumina (or lanthana-alumina) in an amount of about 49 wt. %, and palladium in an amount of about 3 wt. %.

According to one or more embodiments, the second oxidation material comprises a second refractory metal oxide support and platinum (Pt) and palladium (Pd). The ratio of platinum to palladium in the second oxidation material can be varied over a wide range. Generally, there are no specific restrictions as far as the platinum to palladium weight ratio of the second oxidation material is concerned. In one or more embodiments, the platinum to palladium weight ratio of the second oxidation material can be in the range of from about 10:1 to 1:10, including in the range of 5:1 to 1:5, and in the range of 2:1 to 1:1. In one or more embodiments, the platinum to palladium ratio of the second oxidation material can be 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10. In one or more embodiments, the loading of platinum and palladium in the second oxidation material can be in the range of about 5 g/ft$^3$ to 200 g/ft$^3$, including in the range of about 5 g/ft$^3$ to about 150 g/ft$^3$, and about 5 g/ft$^3$ to about 100 g/ft$^3$. Generally, there are no specific restrictions as far as the palladium content of the second oxidation material is concerned. There are also no specific restrictions as far as the platinum content of the second oxidation material is concerned. In specific embodiments, the loading of Pt in the second oxidation material can be in the range of about 8 g/ft$^3$ to about 160 g/ft$^3$, and the loading of Pd in the second oxidation material can be in the range of about 10 g/ft$^3$ to about 100 g/ft$^3$.

In one or more embodiments, the protective overlayer includes a third refractory metal oxide, platinum (Pt), and, optionally palladium (Pd), and a molecular sieve. Generally, there are no specific restrictions as far as the platinum content of the protective overlayer is concerned. In one or more embodiments, the loading of platinum in the protective overlayer can be in the range of about 10 g/ft$^3$ to 100 g/ft$^3$. Generally, there are no specific restrictions as far as the palladium content of the protective overlayer is concerned. In specific embodiments, the loading Pd in the protective overlayer can be in the range of about 0 g/ft$^3$ to 50 g/ft$^3$, including about 0 g/ft$^3$ to about 20 g/ft$^3$. In one or more embodiments, the total PGM loading in the protective overlayer can be from about 10 to about 120 g/ft$^3$.

Without intending to be bound by theory, it is thought that the presence of rare earth oxide, particularly ceria, should be avoided when platinum (Pt) is present in order to avoid deleterious effects on the catalytic activity of the platinum. According to one or more embodiments, the second oxidation material and the protective overlayer are substantially free of rare earth oxide. As used herein, the term "substantially free of rare earth oxide" means that there is no rare earth oxide intentionally added to the second oxidation material or to the protective overlayer, and that there is generally less than about 0.1% of rare earth oxide by weight in the second oxidation material and in the protective overlayer. It will be appreciated by one of skill in the art, however, that during loading/coating trace amounts of rare earth oxide may migrate from one washcoat component to another, such that trace amounts of rare earth oxide can be present in the second oxidation material or in the protective overlayer.

In one or more specific embodiments, the second oxidation material and the protective overlayer are substantially free of ceria. As used herein, the term "substantially free of ceria" means that there is no ceria intentionally added to the second oxidation material or to the protective overlayer, and that there is generally less than about 0.1% of ceria by weight in the second oxidation material and in the protective overlayer. It will be appreciated by one of skill in the art, however, that during loading/coating trace amounts of ceria may migrate from one washcoat component to another, such that trace amounts of ceria can be present in the second oxidation material or in the protective overlayer.

According to one or more embodiments, the protective overlayer includes a molecular sieve, in order to absorb gaseous pollutants, particularly sulfur, and retain them during the initial cold-start period. Without intending to be bound by theory, it is thought that the protective layer including a molecular sieve promoted with a metal selected from one or more of Cu, Fe, Co, Ni, Mn, V, and Ag results in an oxidation catalyst composite that is sulfur tolerant.

As used herein, the terms "sulfur tolerance" or "sulfur resistance" refer to the capability of an oxidation catalyst to oxidize NO, CO, and HC, which is contained in the exhaust gas, without a significant deterioration in activity in the presence of sulfur oxides ($SO_x$). Of particular importance is that the protective overlayer of this invention can be easily desulfated at temperatures achievable in filter regeneration (<650° C.) without requiring a rich desulfation strategy as typically is required for conventional $NO_x$-traps. Without intending to be bound by theory, it is thought that protective overlayer including a refractory metal oxide, platinum (Pt) and, optionally, palladium (Pd), and a molecular sieve promoted with a metal selected from one or more of Cu, Fe, Co, Ni, Mn, V, and Ag prevents sulfur from poisoning the Pd/ceria active sites of the oxidation catalyst composite.

As used herein, the phrase "molecular sieve" refers to framework materials such as zeolites and other framework materials (e.g. isomorphously substituted materials), which may in particulate form in combination with one or more promoter metals be used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, including silicon and aluminum atoms. According to one or more embodiments, it will be appreciated that by defining the molecular sieves by their structure type, it is intended to include the structure type and any and all isotypic framework materials such as SAPO, ALPO and MeAPO materials having the same structure type as the molecular sieve materials.

In more specific embodiments, reference to an aluminosilicate zeolite structure type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. The term "aluminophosphates" refers to another specific example of a molecular sieve, including aluminum and phosphate atoms. Aluminophosphates are crystalline materials having rather uniform pore sizes. Zeolites are crystalline materials having rather uniform pore sizes which, depending upon the type of zeolite and the type and amount of cations included in the zeolite lattice, range from about 3 to 10 Angstroms in diameter. Zeolites generally comprise silica to alumina (SAR) molar ratios of 2 or greater.

Generally, molecular sieves, e.g. zeolite, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

In one or more embodiments, the molecular sieve component comprises $SiO_4/AlO_4$ tetrahedra and is linked by common oxygen atoms to form a three-dimensional network. In other embodiments, the molecular sieve component comprises $SiO_4/AlO_4/PO_4$ tetrahedra. The molecular sieve component of one or more embodiments is differentiated mainly according to the geometry of the voids which are formed by the rigid network of the $(SiO_4)/AlO_4$, or $SiO_4/AlO_4/PO_4$, tetrahedra. The entrances to the voids are formed from 6, 8, 10, or 12 ring atoms with respect to the atoms which form the entrance opening. In one or more embodiments, the molecular sieve component comprises ring sizes of no larger than 12, including 6, 8, 10, and 12.

In one or more embodiments, the molecular sieves can be based on the framework topology by which the structures are identified. Typically, any structure type of molecular sieve can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the molecular sieve component can include all aluminosilicate, borosilicate, gallosilicate, MeAPSO, and MeAPO compositions. In one or more embodiments, the molecular sieve can be a natural or synthetic zeolite such as faujasite, chabazite, clinoptilolite, mordenite, silicalite, zeolite X, zeolite Y, ultrastable zeolite Y, ZSM-5, ZSM-12, SSZ-3, SAPO 5, offretite, or a beta zeolite. In one or more specific embodiments, the molecular sieve is selected from Type A, chabazite, erionite, ZSM-5, ZSM-11, ZSM-23, ZSM-48, ferrierite, stilbite, faujasite, mordenite, Type L, Omega, beta, $AlPO_4$, borosilicates, MeAPO, MeAPSO, and SAPO. In one or more specific embodiment, the molecular sieve has a BEA structure type.

The ratio of silica to alumina of a molecular sieve can vary over a wide range. In one or more embodiments, the molecular sieve has a silica to alumina molar ratio (SAR) in the range of 2 to 300, including 5 to 250; 5 to 200; 5 to 100; and 5 to 50. In one or more specific embodiments, the molecular sieve has a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

In one or more embodiments, the protective overlayer comprises a molecular sieve in a total amount of from 0.1 to 2 $g/in^3$, including 0.25 to 1.5 $g/in^3$, 0.25 to 1.0 $g/in^3$, and 0.25 to 0.8 $g/in^3$. In a specific embodiment, the protective overlayer comprises a molecular sieve in a total amount of about 0.7 $g/in^3$.

The molecular sieve of the protective overlayer of one or more embodiments is subsequently ion-exchanged with one or more promoter metals such as iron (Fe), copper (Cu), cobalt (Co), nickel (Ni), manganese (Mn), vanadium (V), and silver (Ag), among others.

As used herein, the term "promoted" refers to a component that is intentionally added to the molecular sieve, as opposed to impurities inherent in the molecular sieve. Thus, a promoter is intentionally added to enhance activity of a catalyst compared to a catalyst that does not have promoter intentionally added. In order to promote the uptake of sulfur from the exhaust gas, in one or more embodiments, a suitable metal is exchanged into the molecular sieve of the protective overlayer of the oxidation catalyst composite. According to one or more embodiments, the protective overlayer comprises a molecular sieve promoted with a metal selected from Cu, Fe, Co, Ni, Mn, V, Ag, and combinations thereof. In specific embodiments, the molecular sieve is promoted with Cu, Fe, and combinations thereof.

The promoter metal content of the molecular sieve, calculated as the oxide, is, in one or more embodiments, at least about 0.1 wt. %, reported on a volatile-free basis. In specific embodiments, the promoter metal comprises Fe, and the Fe content, calculated as $Fe_2O_3$ is in the range of up to about 10 wt. %, including about 9, about 8, about 7, about 6, about 5, about 4, about 3, about 2, about 1, about 0.5, and about 0.1 wt. %, in each case based on the total weight of the protective overlayer reported on a volatile free oxide basis. In specific embodiments, the Fe content, calculated as $Fe_2O_3$, is in the range of about 1 to about 5 wt. %. In a very specific embodiment, the Fe content, calculated as $Fe_2O_3$ is about 1.5 wt. %, based on the weight of the protective overlayer. Each of the components of the oxidation catalyst composite according to the present invention can be formed from a washcoat that contains the respective support material as described above. Other additives such as binders and stabilizers can also be included in the washcoat. As disclosed in U.S. Pat. No. 4,727,052, porous support materials, such as activated alumina, can be thermally stabilized to retard undesirable alumina phase transformations from gamma to alpha at elevated temperatures. Stabilizers can be selected from alkaline earth metal components selected from the group consisting of magnesium, barium, calcium and strontium. When present, stabilizer materials can be added in an amount from about 0.01 $g/in^3$ to about 0.15 $g/in^3$ in the coating.

Generally, there are no specific restrictions as far as the washcoat loading of each individual component (first oxidation material, second oxidation material, protective overlayer) in the oxidation catalyst is concerned. In one or more embodiments, one or more of the first oxidation material, the second oxidation material, and the protective overlayer can have a washcoat loading in the range of 0.1 $g/in^3$ to 6.0 $g/in^3$, including in the range of about 0.1 $g/in^3$ to about 4.5 $g/in^3$.

In one or more embodiments, the oxidation catalyst including the protective overlayer, and the first and second oxidation materials is then applied to a ceramic or metallic flow-through monolith, or to a wall flow filter. As used herein, the term "layer" is used to denote the location of the diesel oxidation catalyst composite on the carrier substrate. It will be appreciated that, in general, there is no particular order to the layering of the washcoat components.

In one or more embodiments, the first oxidation material is in an under layer on the carrier substrate, the second oxidation material is in a middle layer on the under layer, and the protective overlayer is in an upper layer on (or over) the middle layer.

In one or more embodiments, the first oxidation material and the second oxidation material are mixed in a blended underlayer on the carrier substrate, and the protective overlayer is an upper layer on (or over) the blended underlayer. It will be appreciated by one of skill in the art that the mixing of components can be uniform, but in some cases localized concentrations of the individual components may be chosen in the coating layer to mitigate negative interactions, for example minimization of Pt and rare earth oxide (e.g. ceria) interaction may be beneficial.

In one or more embodiments, the first oxidation material and the second oxidation material are in a zoned relationship in a zoned underlayer on the carrier substrate, and the protective overlayer is an upper layer on (or over) the zoned underlayer. In such embodiments, the first oxidation material can be on the inlet end and the second oxidation material can be located on the outlet end. In other embodiments, the second oxidation material can be on the inlet end and the first oxidation material can be located on the outlet end.

It will be appreciated by one skilled in the art that the upstream/inlet zone and downstream/outlet zones can be at least partially overlapping. In one or more embodiments the upstream/inlet zone is at least partially overlapping the downstream/outlet zone. In other embodiments, the downstream/outlet zone is at least partially overlapping the upstream/inlet zone.

In one or more embodiments, the upstream/inlet zone and the downstream/outlet zone may be directly abutting one another. In still further embodiments, there may be a gap between the upstream/inlet zone and the downstream/outlet zone.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

According to one or more embodiments, the oxidation catalyst composite can further comprise an undercoat layer located between the carrier substrate and the under layer. In one or more embodiments, the undercoat layer comprises alumina, specifically gamma-alumina. In embodiments where the undercoat layer is present, the undercoat layer is coated over the carrier substrate, and then the under layer can be coated over (on top) of the undercoat layer. In one or more embodiments, the undercoat layer can comprise one or more platinum group metals and/or zeolite.

The Carrier Substrate

As used herein, the terms "carrier" and "substrate" refer to the monolithic material onto which the refractory metal oxide support is placed, typically in the form of a washcoat containing a plurality of supports having catalytic species thereon. According to one or more embodiments, the substrate may be any of those materials typically used for preparing DOC catalysts and will typically comprise a foam, a metal or a ceramic honeycomb structure. Any suitable substrate may be employed, such as a monolithic substrate of the type having a plurality of fine, parallel gas flow passages extending therethrough from an inlet to an outlet face of the substrate, such that passages are open to fluid flow therethrough. The passages, which are essentially straight paths from their fluid inlet to their fluid outlet, are defined by walls in which the catalytic material is coated as a "washcoat" so that the gases flowing through the passages contact the catalytic material. A washcoat is formed by preparing a slurry containing a specified solids content (e.g., 30-50% by weight) of supports in a liquid medium, which is then coated onto a carrier substrate and dried to provide a washcoat layer.

The flow passages of the monolithic substrate are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic substrate may be made of any suitable refractory material, e.g., cordierite, cordierite-α alumina, silicon nitride, silicon carbide, aluminum titanate, zirconium mullite, spodumene, alumina-silica magnesia, zirconium silicate, sillimanite, magnesium silicates, zirconia, petalite, α-alumina, aluminosilicates and the like.

The substrates useful for the oxidation catalyst composites according to one or more embodiments may also be metallic in nature and may be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component.

Preparation of Catalyst Composites

The oxidation catalyst composites according to one or more embodiments may be formed in a single layer or in multiple layers, including at least two layers, and at least three layers. In some circumstances, it may be suitable to prepare one slurry of catalytic material and use this slurry to form multiple layers on the substrate. The oxidation catalyst composites can be prepared by known processes, e.g. incipient wetness. A representative process is set forth below.

The oxidation catalyst composite can be prepared in layers on a monolith substrate. For a first layer of a specific washcoat, finely divided particles of a high surface area refractory metal oxide such as gamma alumina are slurried in an appropriate vehicle, e.g. water. The substrate may then be dipped one or more times in such slurry or the slurry may be coated on the substrate such that there will be deposited on the substrate the desired loading of the metal oxide. To incorporate components such as platinum group metals (e.g. palladium, platinum, rhodium, and/or combinations) and stabilizers and/or promoters, such components may be incorporated in the slurry prior to substrate coating as a mixture of water soluble or water-dispersible compounds or complexes. Or alternatively the platinum group metals, stabilizers and promoters may be added as a water-dispersible solution after the slurry is applied to the monolith substrate. Thereafter, the coated substrate is calcined by heating, e.g., at 400-600° C. for about 10 minutes to about 4 hours. When platinum and/or palladium are desired, the platinum and palladium component are used in the form of compounds or complexes to achieve dispersion of the components on the refractory metal oxide support, e.g. activated alumina. As used herein, the term "platinum component" and "palladium component" refer to any compound, complex, or the like which, upon calcinations or use thereof, decomposes or otherwise converts to a catalytically active form, usually the metal or the metal oxide. Generally, aqueous solutions of soluble compounds or complexes of the platinum group metals are used. Non-limiting examples of suitable compounds include palladium nitrate, tetraammine palladium nitrate, platinum chloride, tetraammine platinum acetate, and platinum nitrate. During the calcination steps, or at least during the initial phase of use of the composite, such compounds are converted into a catalytically active form of the metal or a compound thereof.

A suitable method of preparing any layer of the layered catalyst composite is to prepare a mixture of a solution of a desired platinum group metal compounds (e.g., platinum compound and/or a palladium compound) and at least one support, such as a finely divided, high surface area, refractory metal oxide support, e.g., gamma alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds and/or stabilizers, e.g., barium acetate, and a promoter, e.g., lanthanum nitrate, may be added to the slurry.

In one or more embodiments, the slurry is pulverized to result in substantially all of the solids having particle sizes of less than 18 micron. The pulverization may be accomplished in a ball mill or other similar equipment, and the solids content of the slurry may be, e.g., about 20-60 wt. % or 30-40 wt. %.

Additional layers, i.e., second layer may be prepared and deposited upon the first layer in the same manner as described for the deposition of the first layer upon the substrate.

Figure 2:
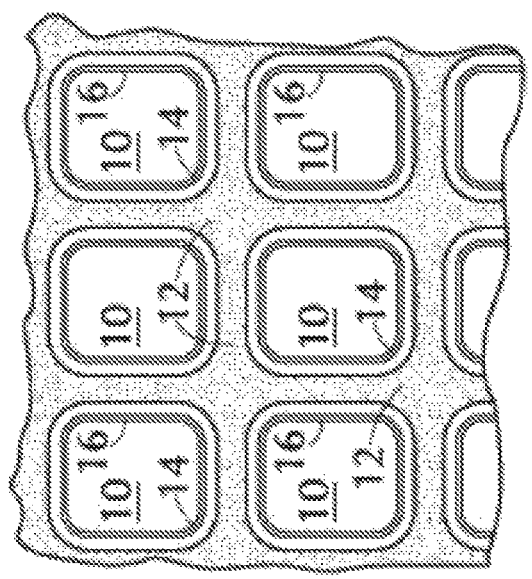
FIG. 2 is a partial cross-sectional view enlarged relative to FIG. 1, which shows an enlarged view of one of the gas flow passages shown in FIG. 1.

The oxidation catalyst composite according to one or more embodiments may be more readily appreciated by references to FIG. 1. FIG. 1 shows a substrate 2, in accordance with one or more embodiments. Referring to FIG. 1, the substrate 2 is a cylindrical shape having a cylindrical outer surface 4, an upstream end face 6 and a downstream end face 8, which is identical to end face 6. Substrate 2 has a plurality of fine, parallel gas flow passages 10 formed therein. As see in FIG. 2, gas flow passages 10 are formed by walls 12 and extend through substrate 2 from upstream end face 6 to downstream end face 8, the gas flow passages 10 being unobstructed so as to permit the flow of a fluid, e.g., a gas stream, longitudinally through substrate 2 via gas flow passages 10 thereof. As is more easily seen in FIG. 2, walls 12 are so dimensioned and configured that gas flow passages 10 have a substantially regular polygonal shape, substantially square in the illustrated embodiment, but with rounded corners in accorded with U.S. Pat. No. 4,335,023. A washcoat layer 14 is adhered to or coated onto the walls 12 of the substrate member. As shown in FIG. 2, an additional washcoat layer 16 is coated over the washcoat layer 14. In one or more embodiments, a third washcoat layer (not shown) can be applied to the substrate below the first washcoat. This third washcoat would be considered an undercoat, and as used herein, "undercoat" refers to the washcoat that contacts the substrate. As will be appreciated by one of skill in the art, the washcoat layer 14 can comprise the first oxidation material, the second oxidation material, the protective overlayer, and combinations thereof, according to one or more embodiments. The additional washcoat layer 16 can comprise the first oxidation material, the second oxidation material, the protective overlayer, or combinations thereof, according to one or more embodiments. In one or more embodiments, a third washcoat layer (not shown) can be applied to the substrate beneath, and can comprise the first oxidation material, the second oxidation material, the protective overlayer, or combinations thereof, according to one or more embodiments.

As shown in FIGS. 1 and 2, the substrate 2 includes void spaces provided by the gas flow passages 10, and the cross-sectional area of these gas flow passages 10 and the thickness of the walls 12 defining the passages will vary from one type of substrate member to another. Similarly, the weight of washcoat applied to such substrates will vary from case to case. Consequently, in describing the quantity of washcoat or catalytic metal component or other component of the composition, it is convenient to use units of weight of component per unit volume of catalyst substrate. Therefore, the units grams per cubic inch ("$g/in^3$") and grams per cubic foot ("$g/ft^3$") are used herein to mean the weight of a component per volume of substrate member, including the volume of void spaces of the substrate member.

Figure 3:
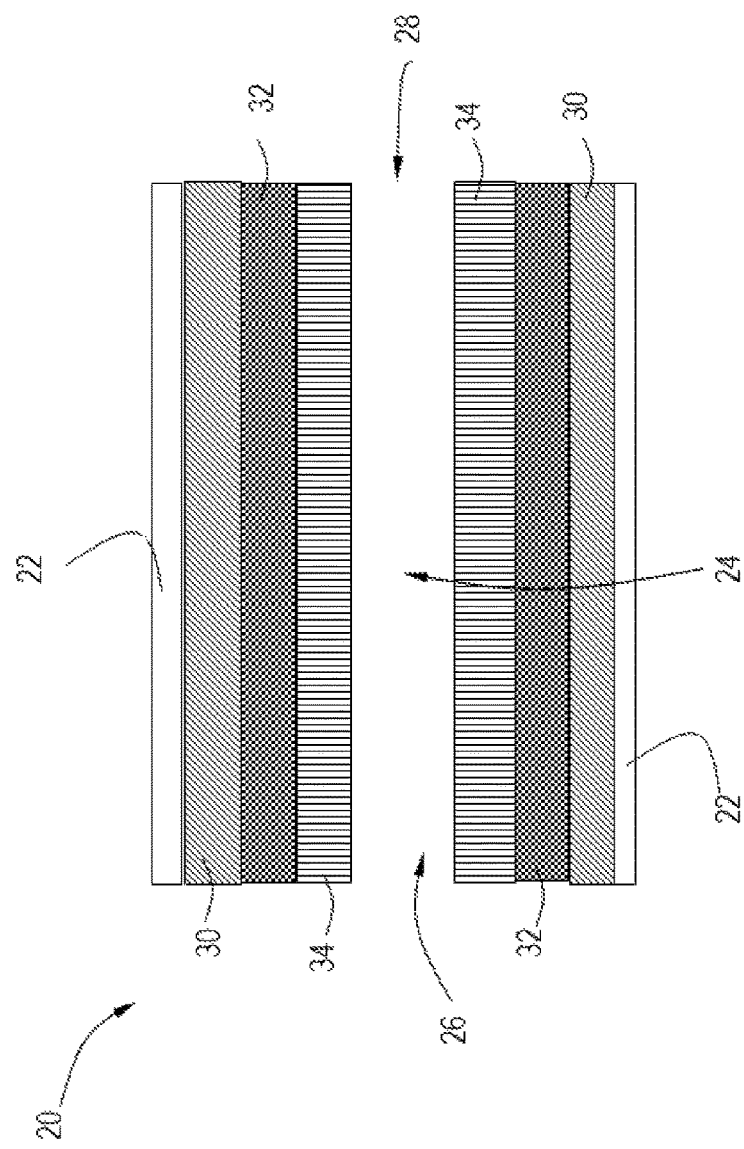
FIG. 3 shows a cross-sectional view of an oxidation catalyst composite according one or more embodiments.
Figure 4:
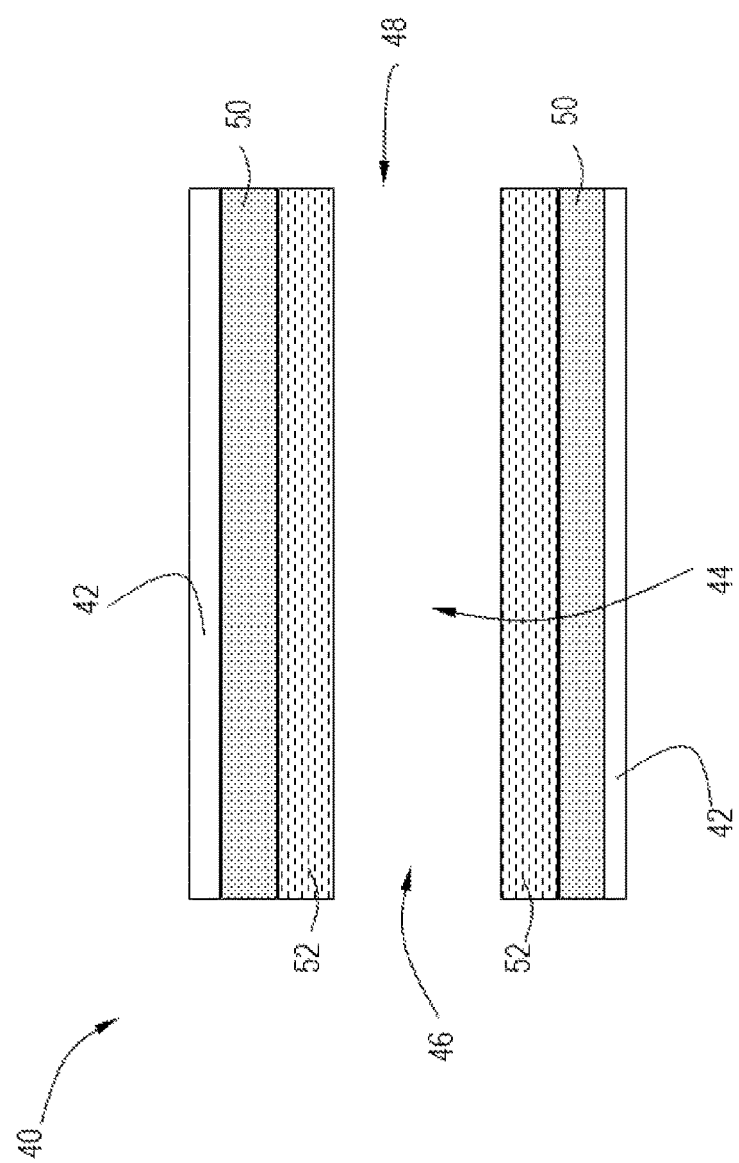
FIG. 4 shows a cross-sectional view of an oxidation catalyst composite according one or more embodiments.
Figure 5:
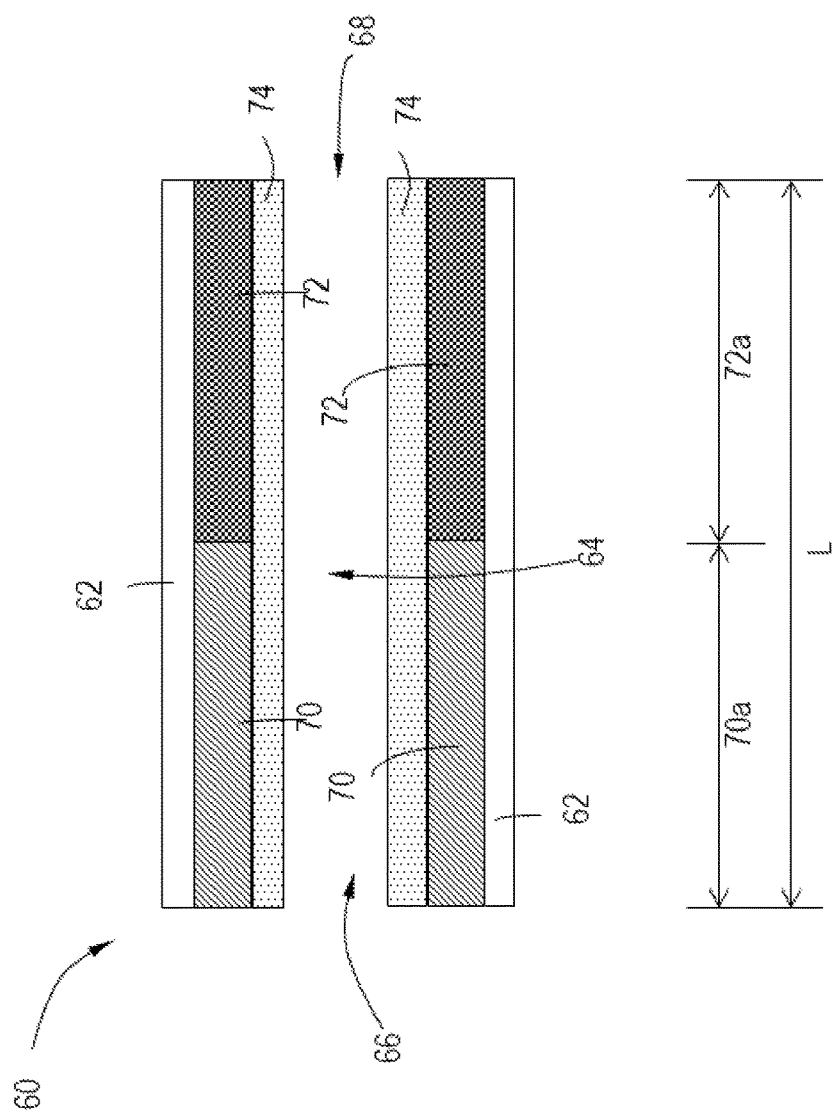
FIG. 5 shows a cross-sectional view of an oxidation catalyst composite according to one or more embodiments.

The oxidation catalyst composite according to one or more embodiments including the first oxidation material, the second oxidation material, and the protective overlayer may be more easily understood by reference to FIGS. 3-5. FIG. 3 shows an embodiment of a layered oxidation catalyst composite 20 for abatement of exhaust gas emissions from a diesel engine. In one or more embodiments, the substrate 22 generally comprises a plurality of channels 24 of a honeycomb substrate, of which only one channel is shown in cross-section for clarity. The substrate 22 has an inlet or upstream end 26 and an outlet or downstream end 28 and contains three separate coated washcoat layers. In one or more embodiments, the first oxidation material is an under layer 30 on the substrate 22; the second oxidation material of one or more embodiments is a middle layer 32 on the under layer 30, and the protective overlayer is an upper layer 34 on the middle layer 32. According to one or more embodiments, the oxidation catalyst composite can further comprise an undercoat layer (not shown) located between the substrate 22 and the under layer 30. In one or more embodiments, the undercoat layer comprises alumina, specifically gamma-alumina. In embodiments where the undercoat layer is present, the undercoat layer (not shown) is coated over the substrate 22, and then the first oxidation material is in an under layer 30 coated over (on top) of the undercoat layer (not shown).

FIG. 4 shows an embodiment of a layered oxidation catalyst composite 40 for abatement of exhaust gas emission from a diesel engine. In one or more embodiments, the substrate 42 generally comprises a plurality of channels 44 of a honeycomb substrate, of which only one channel is shown in cross-section for clarity. The substrate 42 has an inlet or upstream end 46 and an outlet or downstream end 48 and contains two separate coated washcoat layers. In one or more embodiments, the first oxidation material and the second oxidation material are mixed to form a blended under layer 50 on the substrate 42, and the protective overlayer is an upper layer 52 on the blender under layer 50. According to one or more embodiments, the oxidation catalyst composite can further comprise an undercoat layer (not shown) located between the substrate 42 and the under layer 50. In one or more embodiments, the undercoat layer comprises alumina, specifically gamma-alumina. In embodiments where the undercoat layer is present, the undercoat layer (not shown) is coated over the substrate 42, and then the first oxidation material and the second oxidation material are mixed for form a blended under layer 50 coated over (on top) of the undercoat layer (not shown), and the protective overlayer is an upper layer 52 on the blended under layer 50. In one or more embodiments, the undercoat layer (not shown) can comprise one or more platinum group metals and/or zeolite.

FIG. 5 shows an exemplary embodiment of a layered oxidation catalyst composite 60, with an axially zoned under layer including an upstream zone 70 and a downstream zone 72, which may collectively be referred to as a zoned under layer (70/72). Referring to FIG. 5, in one or more embodiments, the substrate 62 generally comprises a plurality of channels 64 of a honeycomb substrate, of which only one channel is show in cross-section for clarity. The substrate 62 has an inlet end 66 and an outlet end 68 downstream from the inlet end 66 and contains two separate coated washcoat layers. The substrate 62 has an axial length L. In one or more embodiments, the first and second oxidation materials are in a zoned relationship coated as a zoned under layer (70/72) on the substrate 62, and the protective overlayer is coated as an upper or top layer 74 over the zoned under layer (70/72). The upper or top layer 74 extends from the inlet end 66 of the substrate 62 through the axial length L of the substrate 62 to the outlet end 68 on top of (or over) the zoned under layer (70/72). In one or more embodiments, the first oxidation material is on the inlet or upstream end, and the second oxidation material is on the outlet or downstream end. The first oxidation material zone 70 extends from the inlet end 66 of the substrate 62 through less than the entire axial length L of the substrate 62. The length of the first oxidation material zone 70 is denoted as first zone 70a in FIG. 5. The second oxidation material zone 72 extends from the outlet end 68 of the substrate 62 through less than the entire axial length L of the substrate 62. The length of the second oxidation material zone 72 is denoted as second zone 72a in FIG. 5. According to one or more embodiments, the oxidation catalyst composite can again further comprise an undercoat layer (not shown) located between the substrate 62 and the first oxidation material zone 70 and the second oxidation material zone 72. In embodiments where the undercoat layer is present, the undercoat layer is coated over the substrate 62, and then the first and second oxidation materials are coated in a zoned relationship over (on top) of the undercoat layer, and protective overlayer is coated as an upper or top layer 74 on the zoned under layer. The order of the first oxidation material zone 70 and second oxidation material zone 72 can be reversed so that the second oxidation material zone 72 is upstream from the first oxidation material zone 70 (not shown).

It will be appreciated by one skilled in the art that the upstream zone and downstream zone can be at least partially overlapping (not illustrated). In one or more embodiments, the upstream zone is at least partially overlapping the downstream zone. In other embodiments, the downstream zone is at least partially overlapping the upstream zone. In one or more embodiments, the at least partial overlap is in the range of from about 0.1% to about 50%. In further embodiments, the upstream zone and the downstream zone may be directly abutting one another. In still further embodiments, there may be a gap between the upstream zone and the downstream zone.

Emission Treatment System

The oxidation catalyst composite of one or more embodiments can be used in an integrated emission treatment system comprising one or more additional components for the treatment of diesel exhaust gas emissions. Thus, embodiments of a further aspect of the invention are directed to systems for treating a gaseous exhaust stream from a diesel engine. The exhaust gas stream can comprise hydrocarbons, carbon monoxide, nitrogen oxides, particulate matter, and other exhaust components, such as sulfur. In one or more embodiments, the exhaust gas treatment system comprises an exhaust conduit in fluid communication with the diesel engine via an exhaust manifold; the oxidation catalyst composite of one or more embodiments; and one or more of the following in fluid communication with the oxidation catalyst composite: a catalyzed soot filter (CSF) and a selective catalytic reduction (SCR) catalyst/article located downstream of the oxidation catalyst composite of one or more embodiments.

In one or more specific embodiments, the exhaust gas treatment system comprises an exhaust conduit in fluid communication with the diesel engine via an exhaust manifold; the oxidation catalyst composite of one or more embodiments; and, in fluid communication with the oxidation catalyst composite, a selective catalytic reduction (SCR) catalyst/article coated directly onto the filter (SCR on a filter) and located downstream of the oxidation catalyst composite. An additional flow-through SCR catalyst may optionally be located downstream of the SCR on a filter.

In other embodiments, the exhaust gas treatment system comprises an exhaust conduit in fluid communication with the diesel engine via an exhaust manifold; the oxidation catalyst composite of one or more embodiments; and, in fluid communication with the oxidation catalyst composite, a selective catalytic reduction (SCR) catalyst/article coated on a flow through monolith downstream from the oxidation catalyst composite of one of more embodiments, and a catalyzed soot filter downstream from the SCR catalyst/article.

In yet further embodiments, the exhaust gas treatment system comprises an exhaust conduit in fluid communication with the diesel engine via an exhaust manifold; the oxidation catalyst composite of one or more embodiments; and, in fluid communication with the oxidation catalyst composite, a catalyzed soot filter downstream of the oxidation catalyst composite of one or more embodiments, and a selective catalytic reduction (SCR) catalyst/article coated on flow through monolith downstream from the catalyzed soot filter. In one or more embodiments, the catalyzed soot filter comprises a second SCR catalyst/article.

In addition to treating the exhaust gas emissions via use of the oxidation catalyst composite according to one or more embodiments, a soot filter for removal of particulate matter may be used. Typically, the soot filter will be located downstream from the oxidation catalyst composite. In one or more embodiments, the soot filter is a catalyzed soot filter (CSF). The CSF may comprise a substrate coated with a washcoat layer containing one or more catalysts for burning off trapped soot and/or oxidizing exhaust gas stream emissions. In general, the soot burning catalyst can be any known catalyst for combustion of soot. For example, the CSF can be coated with one or more high surface area refractory oxides (e.g., an aluminum oxide or ceria-zirconia) for the combustion of unburned hydrocarbons and to some degree particulate matter. The soot burning catalyst can be an oxidation catalyst comprising one or more platinum group metal (PGM) catalysts (platinum, palladium, and/or rhodium).

Figure 6:
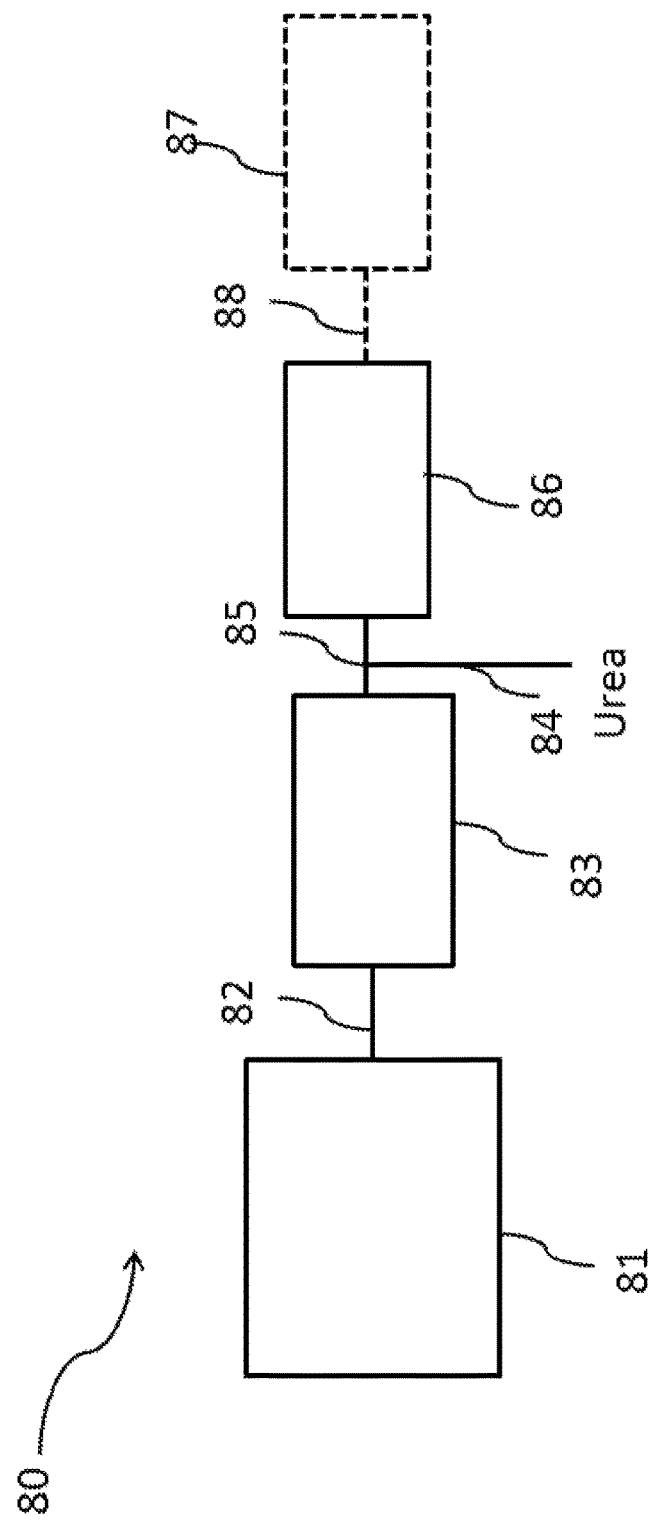
FIG. 6 is a schematic of an engine treatment system according to one or more embodiments.
Figure 7:
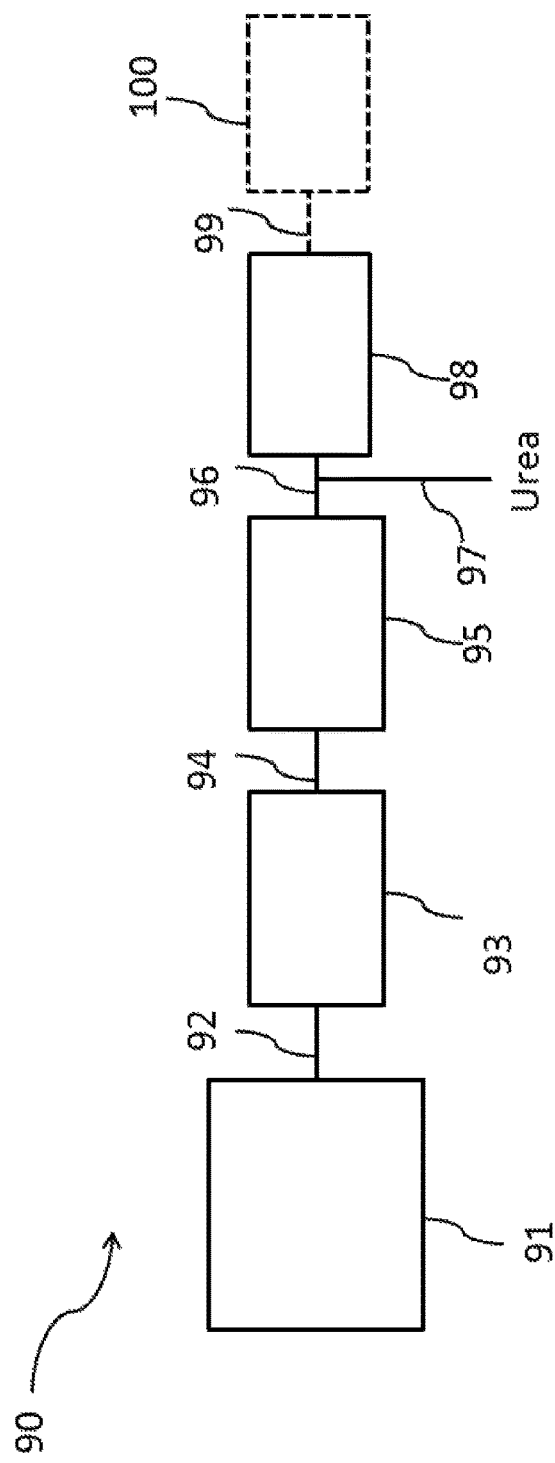
FIG. 7 is a schematic of an engine treatment system according to one or more embodiments.
Figure 8:
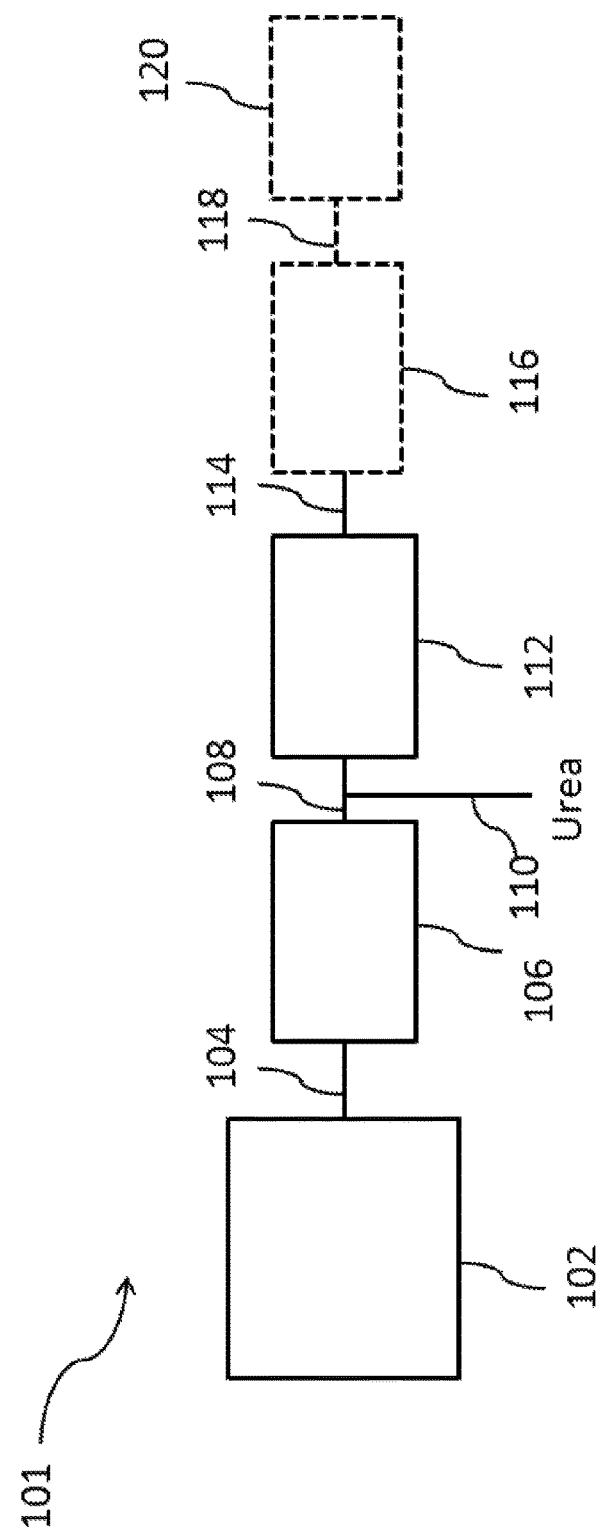
FIG. 8 is a schematic of an engine treatment system according to one or more embodiments.

Exemplary emission treatment systems may be more readily appreciated by reference to FIGS. 6-8, which depict schematic representations of an emission treatment system, in accordance with one or more embodiments of the present invention. FIG. 6 shows an exemplary embodiment of an emission treatment system 80 comprising an exhaust conduit 82 in fluid communication with a diesel engine 81 via an exhaust manifold; and the diesel oxidation catalyst composite 83 according to one or more embodiments. In the diesel oxidation catalyst composite 83, unburned gaseous and volatile hydrocarbons (i.e., the VOF) and carbon monoxide are largely combusted to form carbon dioxide and water. The exhaust stream is next conveyed via exhaust conduit line 85 to a downstream selective catalytic reduction (SCR) catalyst 86. The SCR catalyst 86 is located immediately downstream from the oxidation catalyst composite 83 with no intervening catalyst material between the oxidation catalyst and the SCR catalyst. An ammonia precursor (e.g. aqueous urea) is injected via line 84 into the exhaust conduit line 85. The exhaust gas stream with added ammonia is conveyed via exhaust conduit line 85 to the SCR catalyst 86 for the treatment and/or conversion of $NO_x$. In a specific embodiment, an optional catalyzed soot filter (CSF) 87 may be placed downstream of the SCR catalyst and the exhaust gas stream may be conveyed to the CSF 87 via optional exhaust conduit 88.

In general, any known filter substrate can be used, including, e.g., a honeycomb wall flow filter, wound or packed fiber filter, open-cell foam, sintered metal filter, mesh, etc., with wall flow filters being particularly suitable. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.02 inches.

Typical wall flow filter substrates are composed of ceramic-like materials such as cordierite, •-alumina, silicon carbide, silicon nitride, aluminum titanate, zirconia, mullite, spodumene, alumina-silica-magnesia or zirconium silicate, or of porous, refractory metal. Filter substrates may also be formed of ceramic or metallic fiber composite materials.

In other embodiments, an exemplary emission treatment system may be more readily appreciated by reference to FIG. 7, which depicts a schematic representation of an emission treatment system 90. Referring to FIG. 7, an exhaust gas stream containing gaseous pollutants (e.g., unburned hydrocarbons, carbon monoxide and $NO_x$) and particulate matter is conveyed via an exhaust conduit line 92 from a lean burn engine 91 such as a diesel engine to a diesel oxidation catalyst (DOC) 93, which is in the form of the oxidation catalyst composite according to one or more embodiments of the present invention. In the DOC 93, unburned gaseous and volatile hydrocarbons (i.e., the VOF) and carbon monoxide are largely combusted to form carbon dioxide and water. The exhaust stream is next conveyed via exhaust line 94 to a catalyzed soot filter (CSF) 95, which traps particulate matter present within the exhaust gas stream. The CSF 95 is optionally catalyzed for passive regeneration. After removal of particulate matter, via CSF 95, the exhaust gas stream is conveyed via exhaust line 96. An ammonia precursor (e.g. aqueous urea) is injected via line 97 into the exhaust line 96. The exhaust gas stream with added ammonia is conveyed via exhaust line 96 to a downstream selective catalytic reduction (SCR) component 98 for the treatment and/or conversion of $NO_x$. In one or more embodiments, the exhaust gas stream can be conveyed via optional exhaust conduit 99 to an optional ammonia oxidation catalyst (AMOx) 100 placed downstream of the SCR catalyst 98 to remove any slipped ammonia from the system.

As used herein, the terms "ammonia destruction catalyst" or "ammonia oxidation catalyst (AMOx)" refer to a catalyst that promotes the oxidation of $NH_3$. In specific embodiments, the AMOx catalyst may comprise a platinum group metal such as platinum, palladium, rhodium, or combinations thereof.

Such AMOx catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides, and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalysts can be a SCR catalyst comprising a zeolite and the second catalyst can be an AMOx catalyst comprising a zeolite.

AMOx and/or SCR catalyst composition(s) can be coated on the flow through or wall-flow filter. If a wall flow substrate is utilized, the resulting system will be able to remove particulate matter along with gaseous pollutants. The wall-flow substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

Another exemplary emission treatment system is shown in FIG. 8, which depicts a schematic representation of an emission treatment system 101. Referring to FIG. 8, an exhaust gas stream containing gaseous pollutants (e.g. unburned hydrocarbons, carbon monoxide and $NO_x$) and particulate matter is conveyed via exhaust line 104 from a lean burn engine 102 such as a diesel engine to a diesel oxidation catalyst (DOC) 106, which is in the form of the oxidation catalyst composite according to embodiments of the present invention. In the DOC 106, unburned gaseous and volatile hydrocarbons (i.e. the VOF) and carbon monoxide are largely combusted to form carbon dioxide and water. The exhaust stream is next conveyed via exhaust line 108. An ammonia precursor (e.g. aqueous urea) is injected via line 110 into the exhaust line 108. The exhaust gas stream with added ammonia is conveyed via exhaust line 108 to a selective catalytic reduction component supported within a catalytic soot filter (SCR on a filter) 112, to trap particulate matter present within the exhaust gas stream and treat and/or convert $NO_x$. Optionally, the exhaust gas stream may be conveyed via line 114 to a downstream selective catalytic reduction (SCR) catalyst element 116 for further treatment and/or conversion of $NO_x$. In one or more embodiments, the exhaust gas stream can be conveyed via optional exhaust conduit 118 to an optional ammonia oxidation catalyst (AMOx) 120 placed downstream of the SCR catalyst element 116 in order to remove any slipped ammonia from the system.

In these embodiments, a suitable SCR component is located downstream of the oxidation catalyst composite of one or more embodiments. A suitable SCR catalyst component for use in the emission treatment system is able to effectively catalyze the reduction of the $NO_x$ component at temperatures below 600° C., so that adequate NO levels can be treated even under conditions of low load which typically are associated with lower exhaust temperatures. In an embodiment, the SCR catalyst article is capable of converting at least 50% of the NO component to $N_2$, depending on the amount of reductant added to the system. Another desirable attribute for the composition is that it possesses the ability to selectively catalyze the oxidation of any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, specifically from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations. Other specific SCR compositions that may be used in accordance with one or more embodiments of the invention include 8-ring, small pore molecular sieves. As used herein, the term "small pore" refers to pore openings which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4-ring building units. Zeolites are comprised of secondary building units (SBU) and composite building units (CBU) and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic framework types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the SCR catalyst comprises a molecular sieve having a double six ring (d6r) unit. In a specific embodiment, the SCR catalyst comprises CHA, AEI, or AFX framework type zeolite. In a very specific embodiment, the SCR catalyst comprises CHA framework type zeolite. The SCR catalyst may contain a promoter metal, e.g. copper, iron, cobalt, nickel, lanthanum, cerium, manganese, vanadium, silver, or combinations thereof. More specifically, the SCR catalyst may contain a promoter metal selected from copper, iron, or combinations thereof. In one or more embodiments, exemplary CHA framework type zeolites have a silica to alumina ratio (SAR) greater than about 15, and copper content exceeding about 0.2 wt. %. In a more specific embodiment, the mole ratio of silica to alumina is from about 15 to about 256, and the copper content is from about 0.2 wt. % to about 5 wt. %. Other useful compositions for SCR include non-zeolitic molecular sieves having the CHA framework structure. For example, silicoaluminophosphates such as SAPO-34, SAPO-44, and SAPO-18 may be used in accordance with one or more embodiments. Other useful SCR catalysts can include a mixed oxide including one or more of $V_2O_5$, $WO_3$, and $TiO_2$.

Method of Treatment

A further aspect of the invention is directed to methods for treating a diesel exhaust gas stream comprising carbon monoxide, hydrocarbons, $NO_x$, and particulate matter. In one or more embodiments, the method comprises contacting an exhaust gas stream with the oxidation catalyst composite of one or more embodiments.

Embodiments of the invention are now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Comparative Example A: 134.5 g/ft³ 4/1=Pt/Pd Technology with Alumina (No Ceria)

Bottom Layer: 1.60 g/in³ of high porosity, silica-stabilized (5 wt. %) alumina was impregnated with an aqueous solution of palladium nitrate yielding a final dry Pd content of 27 g/ft³. The resulting mixture was well dispersed in water. An aqueous solution containing the Pt precursor was used to impregnate the metal onto the Pd-containing alumina slurry producing a final dry Pt content of 67.5 g/ft³ and Pt/Pd ratio of 2.5/1. After initial pH adjustment (with nitric, then tartaric acid) to 4.1, the slurry was milled to a particle size $d_{90}$ of 16 μm with a final pH adjustment to 4.1 and subsequent coating onto a monolith with drying at 140° C. in air.

Top Layer: 0.60 g/in³ of a highly porous silica-stabilized (5 wt. %) alumina, onto which an aqueous solution of platinum was impregnated yielding a final dry Pt content of 37.8 g/ft³. The resulting mixture was thoroughly dispersed in water. After initial pH adjustment (using nitric and/or tartaric acids) to 4.1, the slurry was milled to a particle size dm of 15 μm. The pre-milled, Pt-containing slurry was mixed with 0.5 g/in³ of zeolite (BEA type, high SAR). After thorough mixing with water addition, the final pH was adjusted to 4.0, with a total solid content of 38%. The slurry was subsequently coated onto the 1st layer, dried at 140° C. and calcined at 590° C. in air.

Comparative Example B: 130 g/ft³ 2/1=Pt/Pd Technology with Ceria

Bottom Layer: A Palladium nitrate solution was added dropwise to a 1.0 g/in³ of a high porosity γ-alumina that already contains 50 wt. % ceria (Ce—Al 50-50). The total ceria content in this wash coat is therefore 0.5 g/in³. The resulting frit contained 3.8 wt. % Pd on ceria. The mixture was dispersed in water and acid (e.g. acetic acid) with pH adjustment by nitric acid to 5.3, then 0.1 g/in³ of another high porosity alumina was added to the slurry and thoroughly mixed, followed by a second pH adjustment to 4.7 and subsequent milling to particle size $d_{90}$ of 20 µm. The total Pd content of the final slurry was 33.34 g/ft³ with a solid content of 36%. Coating onto a monolith was done followed by drying at 140° C. in air.

Middle Layer: 0.85 g/in³ of high porosity alumina stabilized by 5% silica was impregnated using an aqueous solution of palladium nitrate producing a final dry Pd content of 10.83 g/ft³. The resulting mixture was dispersed in water. An aqueous solution containing an amine stabilized platinum was used as Pt-precursor, which was added to the Pd-containing slurry producing a final dry Pt content of 20.83 g/ft³ and Pt/Pd ratio of 1.9/1. After pH adjustment (with nitric, then tartaric acid) to 4.1, the slurry was milled to a particle size $d_{90}$ of 16 µm and subsequently coated onto the bottom layer followed by drying at 140° C. in air.

Top Layer: 1.30 g/in³ of a highly porous alumina (with 5 wt. % manganese), onto which an aqueous solution of platinum was impregnated yielding a final dry Pt content of 65 g/ft³. The resulting mixture was dispersed in water. After pH adjustment (using nitric and/or tartaric acids) to 4.3, the slurry was milled to a particle size $d_{90}$ of 20 µm. The pre-milled, Pt-containing slurry was mixed with 0.5 g/in³ of zeolite (BEA type). After thorough mixing with water addition, a final dispersion milling enhanced a dm of 17 µm. The pH was re-adjusted to 4.3, with total solid content of 38%. The slurry was subsequently coated onto the middle layer, dried at 140° C. and calcined at 590° C. in air.

Example C: 135 g/ft³ 3/2=Pt/Pd Technology with Ceria

Bottom Layer: Palladium nitrate solution (80% of total Pd in the bottom layer) was added to a physical mixture of 0.75 g/in³ high porous γ-alumina (with 4% lanthanum oxide) and 0.75 g/in³ pure ceria. The resulting frit contained 2.0 wt. % Pd on ceria. The mixture was dispersed in water and acid (e.g. acetic acid) and milled to a particle size $d_{90}$ of 15 µm. The remaining (20%) palladium nitrate solution was added to the pre-milled slurry, dispersed with more acid (acetic and tartaric acids) and milled to a particle size $d_{90}$ of 7 µm. The final slurry was composed of 2.4 wt. % Pd on ceria and 31 g/ft³ total Pd loading. The slurry containing all components mentioned above was coated onto a monolith and dried at 140° C. air.

Middle Layer: 1.4 g/in³ of high porosity alumina stabilized by 5% silica was impregnated with an aqueous solution of palladium nitrate yielding a final dry Pd content of 20 g/ft³. The resulting mixture was dispersed in water. A colloidal platinum suspension with 2% Pt was thoroughly stirred in a large container with appropriate capacity to disperse the platinum particles. The dispersed Pd frit was slowly added to the Pt suspension under constant stirring, producing a dry content of Pt of 40 g/ft³ and a Pt/Pd ratio of 2. After pH adjustment (with nitric, then tartaric acid) to 4.5, the slurry was milled to a particle size $d_{90}$ of 16 µm. The slurry was subsequently coated onto the bottom layer, dried at 140° C. in air.

Top Layer: 0.70 g/in³ of a highly porous alumina (with 5 wt. % Silica) was impregnated with an aqueous solution of palladium nitrate yielding a final dry Pd content of 3 g/ft³. The resulting mixture was dispersed in water. A colloidal platinum suspension with 2% Pt was thoroughly stirred in a large container with appropriate capacity to disperse the platinum particles. The dispersed Pd frit was slowly added to the Pt suspension under constant stirring, producing a dry content of Pt of 42 g/ft³ yielding a total Pt/Pd ratio of 14. After pH adjustment (using nitric and/or tartaric acids) to 4.5, the slurry was milled to a particle size $d_{90}$ of 20 µm. The pre-milled, precious metal containing slurry was mixed with 0.7 g/in³ of an iron-containing zeolite (BEA type, 1.5 wt. % Fe). After a thorough mixing with water addition, pH adjustment to 4.3, the total solid content was fixed to 35%. The slurry was subsequently coated onto the middle layer, dried at 140° C. air and calcined at 590° C. in air.

Catalyst Performance Evaluation

Oven aging was done in an oven equipped with several gas lines for simultaneous dosage of two or more gases. All catalysts were aged together in the oven at 800° C. hydrothermally (10% O2 and 10% steam) for 16 hours. The ramp up phase to the desired aging temperature lasted 4 hours, catalysts were maintained at 800° C. for 16 hours. The oven door was opened to allow for a sudden and rapid cool down of catalysts.

Engine bench evaluation was performed on a transient engine test cell. The bench is equipped with a 4-cylinder Euro 6 light-duty diesel engine with 1.6 l engine displacement. For emission measurements, a 3 line system AVL AMA 400 was used. In addition, a FTIR Amluk/MKS system is available for $SO_x$ and $NO_x$ detection.

For light-off (steady state) evaluation, each monolith was suitably canned and placed downstream in the exhaust line of a 4 cylinder light duty diesel engine with 1.6 l engine displacement. The light-off entailed separate protocols for CO/HC and NO oxidation evaluation. For CO and HC, the engine is operated in the exhaust gas recycling mode (EGR) in order to produce large emissions of CO and HC gases, while the NO light-off was undertaken without the EGR mode to enhance high engine $NO_x$ emissions. Typical concentrations in the exhaust stream (engine emissions) were constant at 1200, 99 and 110 ppm, respectively (CO, HC and $NO_x$ emissions; CO/HC light-off) and 315, 50 and 700 ppm (CO, HC and $NO_x$ emissions; NO light-off). Temperature ramps of 3-4° C./min were employed in both procedures.

The catalysts were sulfated using either a 6 cylinder engine with 3 l engine displacement by combusting high sulfur fuel (350 ppm) over the catalysts at 300-350° C., or with direct injection of gaseous $SO_2$ in the exhaust line of a 4 cylinder engine with 2 l engine displacement. Desulfation was achieved by: (1) either placing a burner (with fuel injection) diesel oxidation catalyst upstream of the sulfated catalysts to produce the desired desulfation temperature that can be used downstream or (2) by creating the exotherm on the sulfated catalysts themselves using a well-defined engine operation mode. Both sulfation/desulfation methods were applied in this study and the amount of $SO_2$ released by sulfated catalysts did not depend to any extent on the method used.

Figure 9:
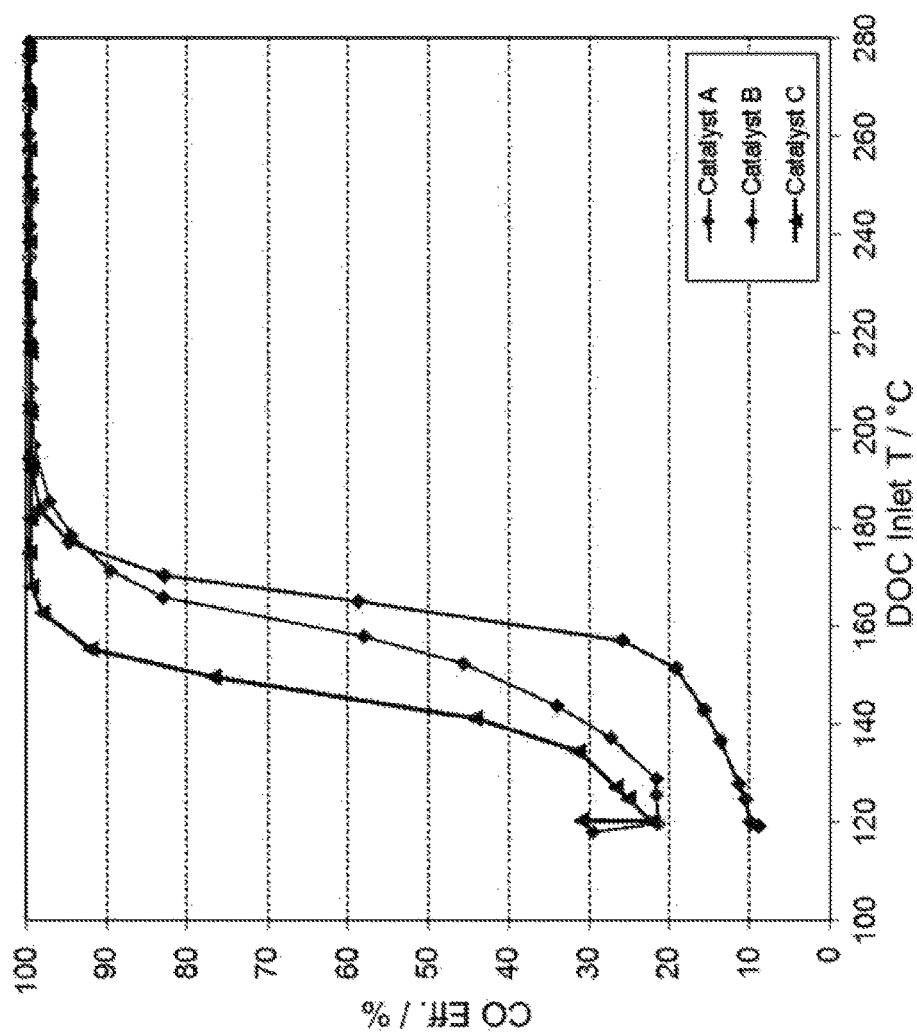
FIG. 9 is a graph of the CO light-off for oxidation catalyst composites according to the Examples.
Figure 10:
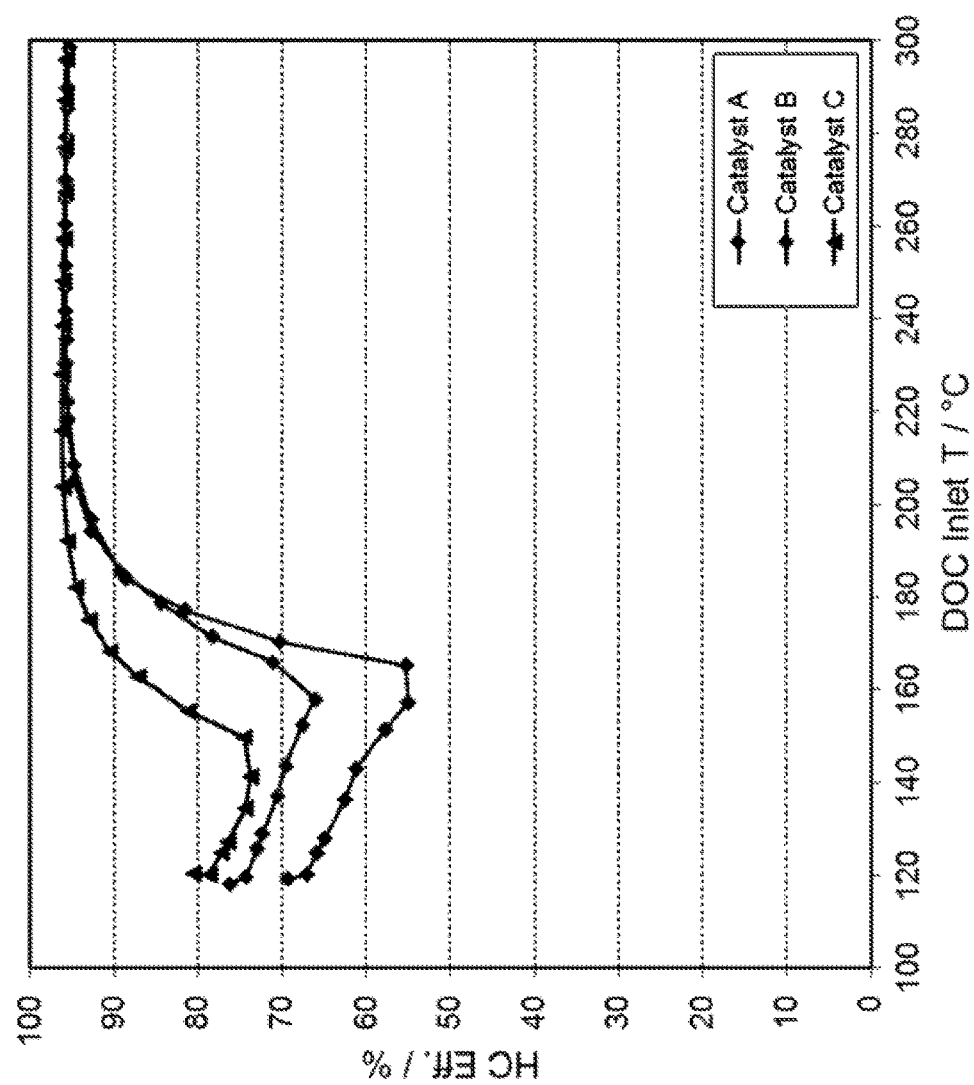
FIG. 10 is a graph of the HC light-off for oxidation catalyst composites according to the Examples.

FIG. 9 shows the CO light-off curves for the oven-aged catalysts of Comparative Examples A and B, and for Example C. Catalysts C and B show higher CO conversions at lower temperatures compared to Catalyst A. FIG. 10 shows the HC light-off curves for the oven-aged catalysts of Comparative Examples A and B, and for Example C. HC light-off performance of Catalyst C is significantly better than for Catalyst A and Catalyst B. All catalysts are platinum group metal cost-equivalent.

Figure 11:
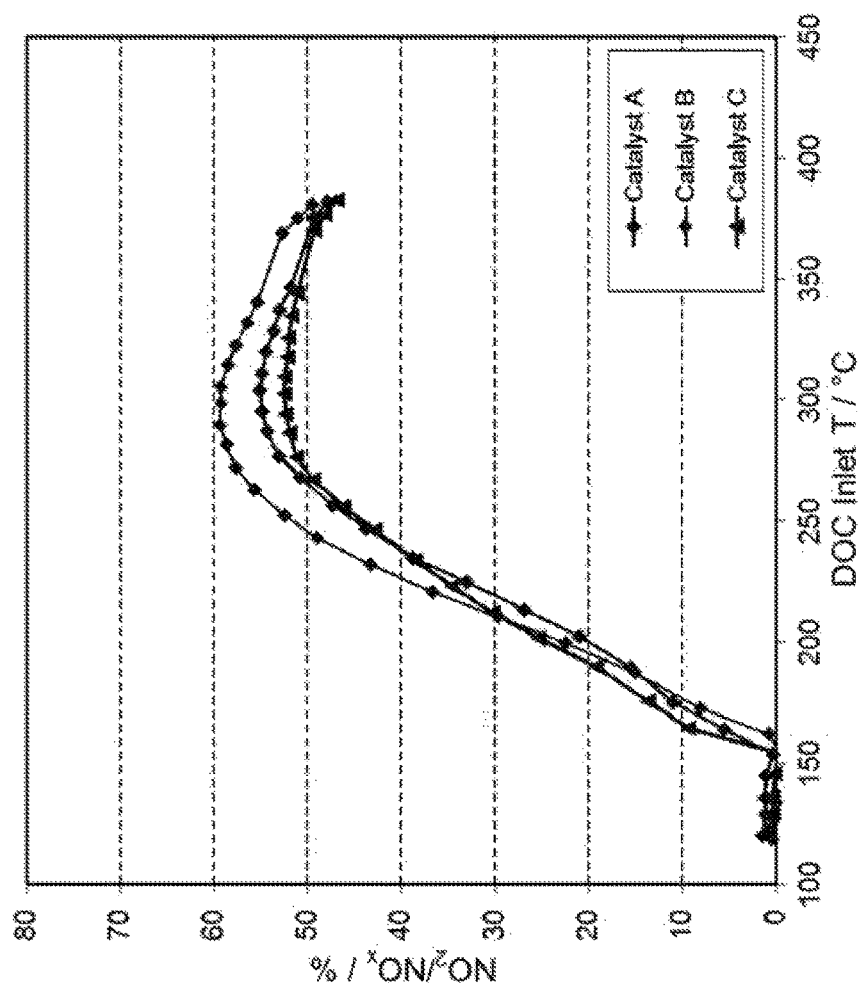
FIG. 11 is a graph of the $NO_2/NO_x$ light-off oxidation catalyst composites according to the Examples.

FIG. 11 shows the $NO_2/NO_x$ light-off curves for the oven-aged catalysts of Comparative Examples A and B, and for Example C. Catalysts A and C show equivalent NO oxidation (similar amounts of Pt in the top layer), Catalyst B is the overall better, but Catalyst B has over 30% more Pt in the top layer). All catalysts are platinum group metal cost-equivalent.

The results of FIGS. 9-11 are summarized in Table 1

TABLE 1

| Light-Off | Example A | Example B | Example C |
|---|---|---|---|
| CO $T_{50}$ (° C.) | 163 | 153 | 143 |
| CO $T_{70}$ (° C.) | 167 | 162 | 148 |
| HC $T_{70}$ (° C.) | 170 | 166 | 155 ($T_{80}$) |
| $NO_2/NO_x$ @ 300° C. (%) | 55 | 59 | 52 |

Table 2 shows the CO light-off results for the oven-aged, sulfated and de-sulfated catalysts of Comparative Example A and for Example C. Table 2 also shows the HC light-off results for the oven-aged, sulfated and de-sulfated catalysts of Comparative Example A and for Example C. Catalyst C shows higher sensitivity to sulfur, Catalyst A (Pt/Pd alumina) is less sensitive. Both catalysts recover from sulfation.

TABLE 2

| Light-Off | Example A | Example C |
|---|---|---|
| CO $T_{50}$ (° C.)/oven-aged | 163 | 143 |
| CO $T_{50}$ (° C.)/sulfated | 166 | 163 |
| CO $T_{50}$ (° C.)/de-sulfated | 160 | 144 |
| HC $T_{70}$ (° C.)/oven-aged | 170 | 155 ($T_{80}$) |
| HC $T_{70}$ (° C.)/sulfated | 174 | 163 |
| HC $T_{70}$ (° C.)/de-sulfated | 168 | 156 ($T_{80}$) |
| $NO_2/NO_x$ @ 300° C. (%)/oven | 55 | 52 |
| $NO_2/NO_x$ @ 300° C. (%)/ + S | 51 | 52 |
| $NO_2/NO_x$ @ 300° C. (%)/ − S | 49 | 51 |

Table 3 shows the CO light-off results for the oven-aged, sulfated and de-sulfated catalysts of Comparative Example B and for Example C. Both catalysts show higher sensitivity to sulfur (higher CO $T_{50}$), however, Catalyst C recovers to oven-aged $T_{50}$ values, while Catalyst B does not. Table 3 also shows the HC light-off curves for the oven-aged, sulfated and de-sulfated catalysts of Comparative Example B and for Example C. Catalyst C recovers significantly, while Catalyst B does not recover from sulfur.

TABLE 3

| Light-Off | Example B | Example C |
|---|---|---|
| CO $T_{50}$ (° C.)/oven-aged | 153 | 143 |
| CO $T_{50}$ (° C.)/sulfated | 176 | 163 |
| CO $T_{50}$ (° C.)/de-sulfated | 171 | 144 |
| HC $T_{70}$ (° C.)/oven-aged | 162 | 155 ($T_{80}$) |
| HC $T_{70}$ (° C.)/sulfated | 183 | 163 |
| HC $T_{70}$ (° C.)/de-sulfated | 180 | 156 ($T_{80}$) |
| $NO_2/NO_x$ @ 300° C. (%)/oven | 59 | 52 |
| $NO_2/NO_x$ @ 300° C. (%)/ + S | 59 | 52 |
| $NO_2/NO_x$ @ 300° C. (%)/ − S | 60 | 51 |

Figure 12:
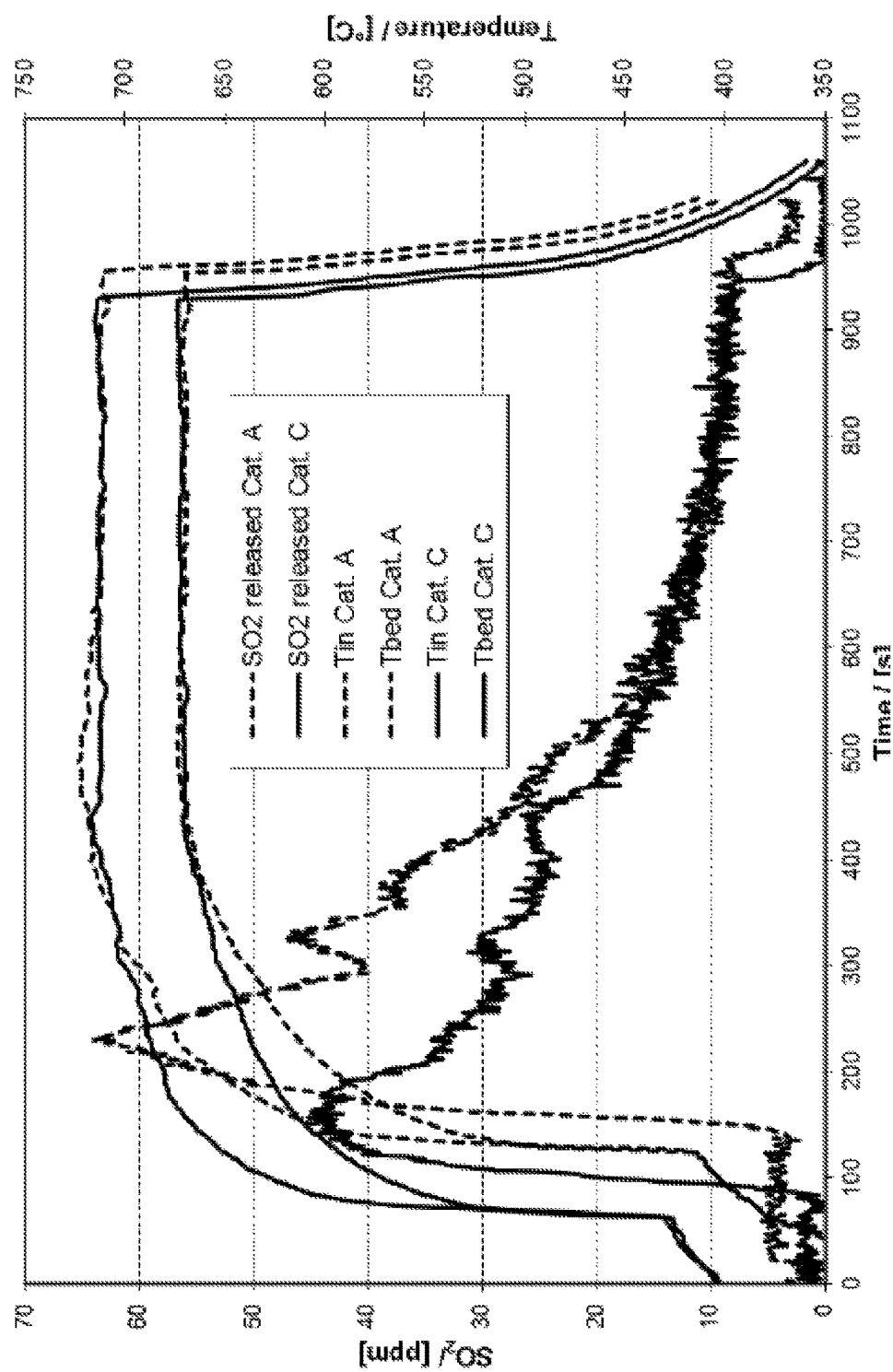
FIG. 12 is a graph of the $SO_2$ Emission for oxidation catalyst composites according to the Examples.
Figure 13:
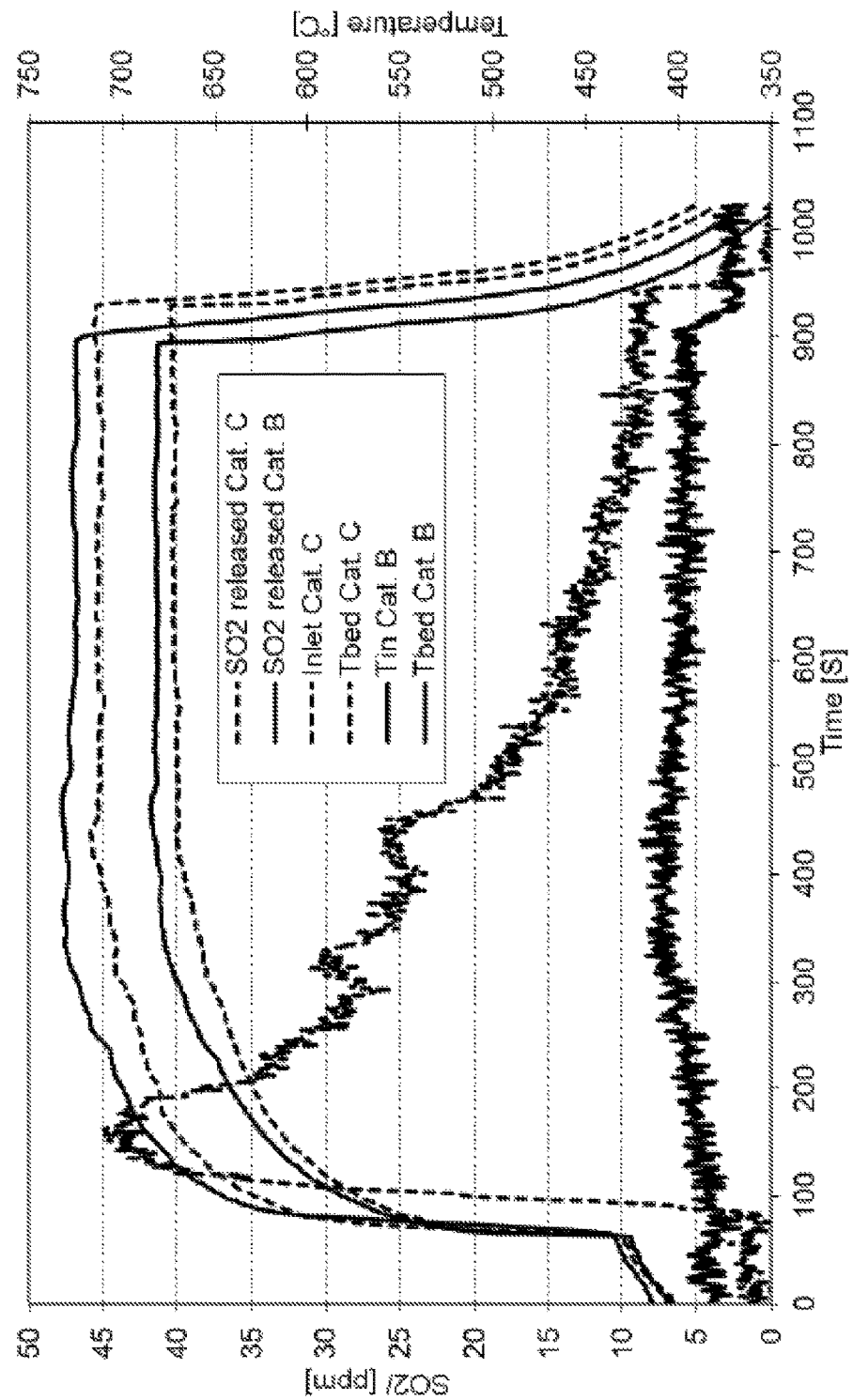
FIG. 13 is a graph of $SO_2$ Emission for oxidation catalyst composites according to the Examples.

FIG. 12 shows the $SO_2$ Emission from sulfated Catalysts A and C. Both catalysts release similar amounts of $SO_2$ following high temperature lean desulfation with inlet temperatures around 650° C. Exotherm creation is also similar for both catalysts. FIG. 13 shows the $SO_2$ Emission from Sulfated ceria Catalysts B and C. Only Catalyst C releases $SO_2$ following high temperature lean desulfation, even though inlet and bed temperatures were identical for both catalysts.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

The invention claimed is:

1. An oxidation catalyst composite for abatement of exhaust gas emissions from a lean burn engine, the catalyst composite comprising:
 a carrier substrate having a length, an inlet end and an outlet end, an oxidation catalyst material on the carrier, the oxidation catalyst material comprising:
  a first oxidation material including a first refractory metal oxide support, a rare earth oxide component, and palladium (Pd), the first oxidation material being substantially free of platinum;
  a second oxidation material including a second refractory metal oxide support, and platinum (Pt) and palladium (Pd) in a platinum to palladium ratio of 10:1 to 1:10, the second oxidation material being substantially free of rare earth oxide; and
  a protective overlayer including a third refractory metal oxide, platinum (Pt) and, optionally, palladium (Pd), and a molecular sieve promoted with a metal selected from one or more of Cu, Fe, Co, Ni, Mn, V, and Ag, the protective overlayer being substantially free of a rare earth oxide.

2. The oxidation catalyst composite of claim 1, wherein the first oxidation material is in an underlayer on the carrier substrate, the second oxidation material is in a middle layer on the under layer, and the protective overlayer is in an upper layer on the middle layer.

3. The oxidation catalyst composite of claim 1, wherein the first oxidation material and second oxidation material are mixed in a blended underlayer on the carrier substrate, and the protective overlayer is an upper layer on the blended underlayer.

4. The oxidation catalyst composite of claim 1, wherein the first oxidation material and the second oxidation material are in a zoned underlayer on the carrier substrate, and the protective overlayer is an upper layer on the zoned underlayer.

5. The oxidation catalyst composite of claim 4, wherein the first oxidation material is on the inlet end and the second oxidation material is on the outlet end.

6. The oxidation catalyst composite of claim 4, wherein the second oxidation material is on the inlet end and the first oxidation material is on the outlet end.

7. The oxidation catalyst composite of claim 1, wherein the first, second, and third refractory metal oxide supports independently comprise an oxide of one or more of alumina, zirconia, alumina-zirconia, lanthana-alumina, lanthana-zirconia-alumina, baria-alumina, baria-lanthana-alumina, baria-lanthana-neodymia-alumina, alumina-chromia.

8. The oxidation catalyst composite of claim 1, wherein the first oxidation material comprises palladium in an amount in the range of about 1 $g/ft^3$ to 70 $g/ft^3$, and wherein the second oxidation material comprises palladium and platinum in an amount in the range of about 5 $g/ft^3$ to about 150 $g/ft^3$.

9. The oxidation catalyst composite of claim 1, wherein the rare earth oxide is selected from ceria (Ce), lanthana (La), praseodymia (Pr), neodynmia (Nd), europia (Eu), samaria (Sm), ytterbia (Yb), and combinations thereof, and a stabilizer optionally mixed therein, the stabilizer selected from zirconia (Zr), niobia (Nb), yttria (Y), alumina (Al), and combinations thereof.

10. The oxidation catalyst composite of claim 1, wherein the ratio of Pd to the rare earth oxide is in the range of 1 to 5 by weight, based on the weight of the first oxidation material.

11. The oxidation catalyst composite of claim 1, wherein the rare earth oxide component in the first oxidation material is present in an amount in the range 0.1 $g/in^3$ to 5 $g/in^3$.

12. The oxidation catalyst composite of claim 1, wherein the rare earth oxide component in the first oxidation material comprises ceria (Ce).

13. The oxidation catalyst composite of claim 12, wherein the Ce is doped with an element selected from Si, Mn, Fe, Co, Ni, Cu, In, Sn, Ir, Pr, and combinations thereof.

14. The oxidation catalyst composite of claim 1, wherein the protective overlayer comprises a molecular sieve having a six, eight, ten, or twelve ring structure.

15. The oxidation catalyst composite of claim 1, wherein the molecular sieve is selected from the group consisting of Type A, chabazite, erionite, ZSM-5, ZSM-11, ZSM-23, ZSM-48, ferrierite, stilbite, faujasite, mordenite, Type L, Omega, Beta, $AlPO_4$, borosilicates, MeAPO, MeAPSO, and SAPO.

16. The oxidation catalyst composite of claim 1, wherein the ratio of platinum to palladium in the second oxidation material is in the range of 5:1 to 1:5.

17. The oxidation catalyst composite of claim 1, wherein the ratio of platinum to palladium in the second oxidation material is in the range of 2:1 to 1:1.

18. The oxidation catalyst composite of claim 1, wherein the carrier substrate is selected from a flow-through monolith, a wall-flow filter, a foam, or a mesh.

19. A method for treating a diesel engine exhaust gas stream, the method comprising contacting an exhaust gas stream with the oxidation catalyst composite of of claim 1, and passing the exhaust gas stream through a downstream SCR catalyst.

20. The method of claim 19, wherein the downstream SCR catalyst is disposed on a wall flow filter.

21. A system for treatment of a lean burn engine exhaust gas stream comprising hydrocarbons, carbon monoxide, nitrogen oxides, particulate matter, and other exhaust components, the system comprising:
an exhaust conduit in fluid communication with a lean burn engine via an exhaust manifold;
the oxidation catalyst composite of claim 1; and
a catalyzed soot filter and an SCR catalyst located downstream from the oxidation catalyst composite.

22. The system of claim 21, wherein the SCR catalyst is present as a washcoat on the catalyzed soot filter.

23. The system of claim 22, further comprising a second SCR catalyst on a flow through monolith downstream of the SCR catalyst.

24. The system of claim 21, wherein the SCR catalyst is on a flow through monolith downstream from the oxidation catalyst composite, and the catalyzed soot filter is downstream from the SCR catalyst.

25. The system of claim 21, wherein the catalyzed soot filter is downstream of the oxidation catalyst composite and the SCR catalyst is on a flow through monolith downstream from the catalyzed soot filter.

26. The system of claim 24, wherein the catalyzed soot filter comprises a second SCR catalyst.

27. The system of claim 21, wherein the SCR catalyst comprises a molecular sieve having a double six ring (d6r) unit.

28. The system of claim 21, wherein the SCR catalyst is selected from CHA, AEI, or AFX framework type zeolite.

\* \* \* \* \*

UNITED STATES PATENT AND TRADEMARK OFFICE
CERTIFICATE OF CORRECTION

PATENT NO. : 10,328,388 B2
APPLICATION NO. : 15/748501
DATED : June 25, 2019
INVENTOR(S) : Karifala Dumbuya et al.

It is certified that error appears in the above-identified patent and that said Letters Patent is hereby corrected as shown below:

In the Claims

In Column 28, Claim 19, Line 15, after "composite", delete "of".

Signed and Sealed this
Twenty-ninth Day of October, 2019

Andrei Iancu
*Director of the United States Patent and Trademark Office*